(12) United States Patent
Koyama

(10) Patent No.: US 7,764,325 B2
(45) Date of Patent: Jul. 27, 2010

(54) ELECTRO-OPTICAL DEVICE, METHOD OF PRODUCING THE SAME, AND ELECTRONIC APPARATUS

(75) Inventor: Noboru Koyama, Chino (JP)

(73) Assignee: Seiko Epson Corporation, Tokyo (JP)

( * ) Notice: Subject to any disclaimer, the term of this patent is extended or adjusted under 35 U.S.C. 154(b) by 698 days.

(21) Appl. No.: 11/651,340

(22) Filed: Jan. 9, 2007

(65) Prior Publication Data

US 2007/0165148 A1 Jul. 19, 2007

(30) Foreign Application Priority Data

Jan. 13, 2006 (JP) .............................. 2006-006634

(51) Int. Cl.
*G02F 1/1343* (2006.01)
*G02F 1/136* (2006.01)

(52) U.S. Cl. .......................................... 349/38; 349/44

(58) Field of Classification Search ............. 349/38–44, 349/110
See application file for complete search history.

(56) References Cited

U.S. PATENT DOCUMENTS

| | | | |
|---|---|---|---|
| 6,521,913 B1 | 2/2003 | Murade | |
| 6,697,136 B1 | 2/2004 | Yasukawa | |
| 6,765,230 B2 | 7/2004 | Murade | |
| 6,770,909 B2 | 8/2004 | Murade | |
| 6,872,975 B2 | 3/2005 | Murade | |
| 7,271,867 B2 * | 9/2007 | Kim et al. .................... | 349/138 |
| 7,403,237 B2 * | 7/2008 | Iki .............................. | 349/43 |
| 7,474,363 B2 * | 1/2009 | Kim et al. .................... | 349/43 |

FOREIGN PATENT DOCUMENTS

| | | |
|---|---|---|
| JP | 2000-75320 A | 3/2000 |
| JP | 2000-267596 A | 9/2000 |
| JP | 2001-166337 A | 6/2001 |
| JP | 2001-330861 A | 11/2001 |
| JP | 2002-090721 A | 3/2002 |
| JP | 2002-094072 A | 3/2002 |
| JP | 2002-244153 A | 8/2002 |
| JP | 2003-005170 A | 1/2003 |
| JP | 2005-107548 A | 4/2005 |

* cited by examiner

*Primary Examiner*—Dung T. Nguyen
(74) *Attorney, Agent, or Firm*—AdvantEdge Law Group, LLC

(57) ABSTRACT

An electro-optical device includes a substrate; a plurality of data lines and a plurality of scanning lines arranged in a pixel region on the substrate; transistors disposed in associated pixel portions in the pixel region on the substrate, the transistors being electrically connected to the data lines and the scanning lines, and the transistors each having a semiconductor layer subjected to hydrogenation performed from an upper layer; storage capacitors disposed below the transistors in the associated pixel portions on the substrate, the storage capacitors being electrically connected to the transistors; and pixel electrodes disposed in the associated pixel portions on the substrate, the pixel electrodes being electrically connected to the transistors and the storage capacitors.

11 Claims, 15 Drawing Sheets

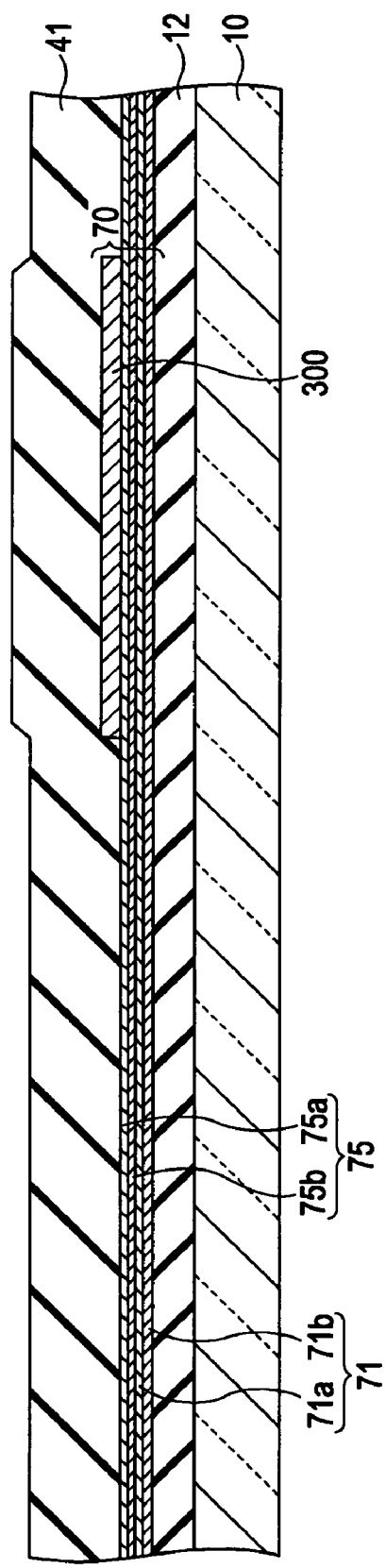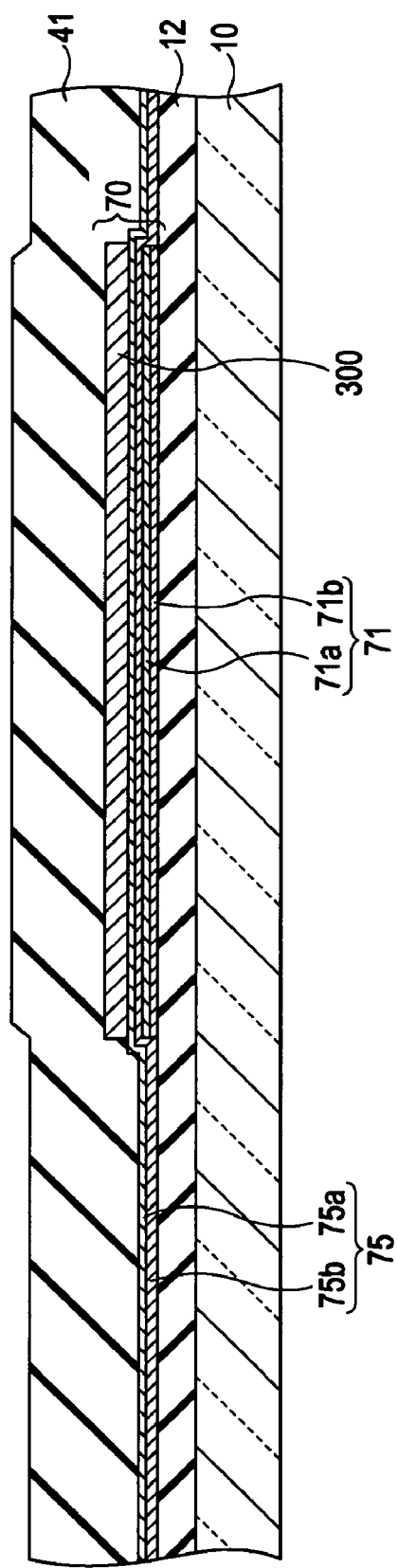

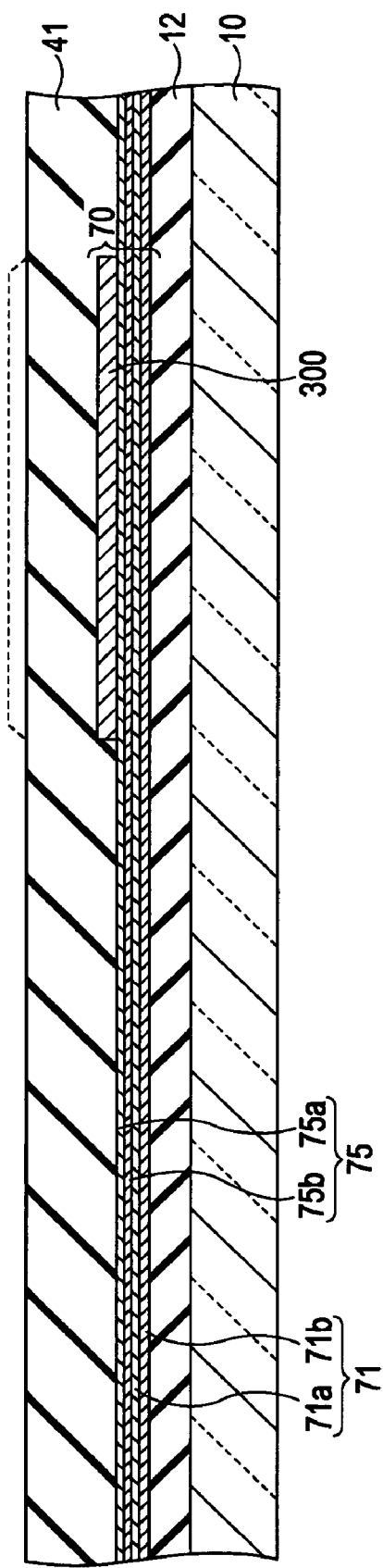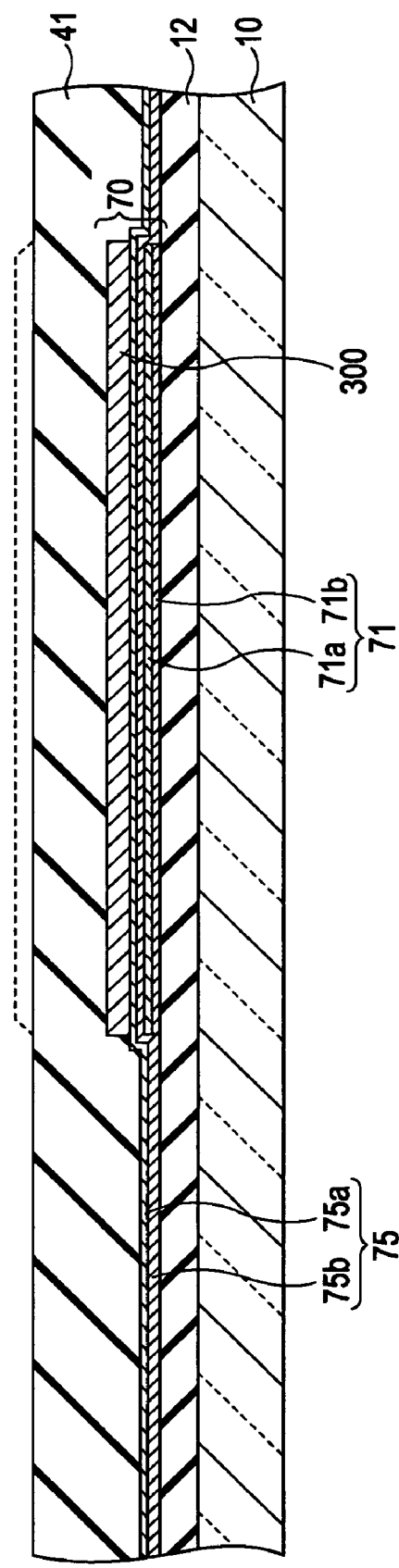

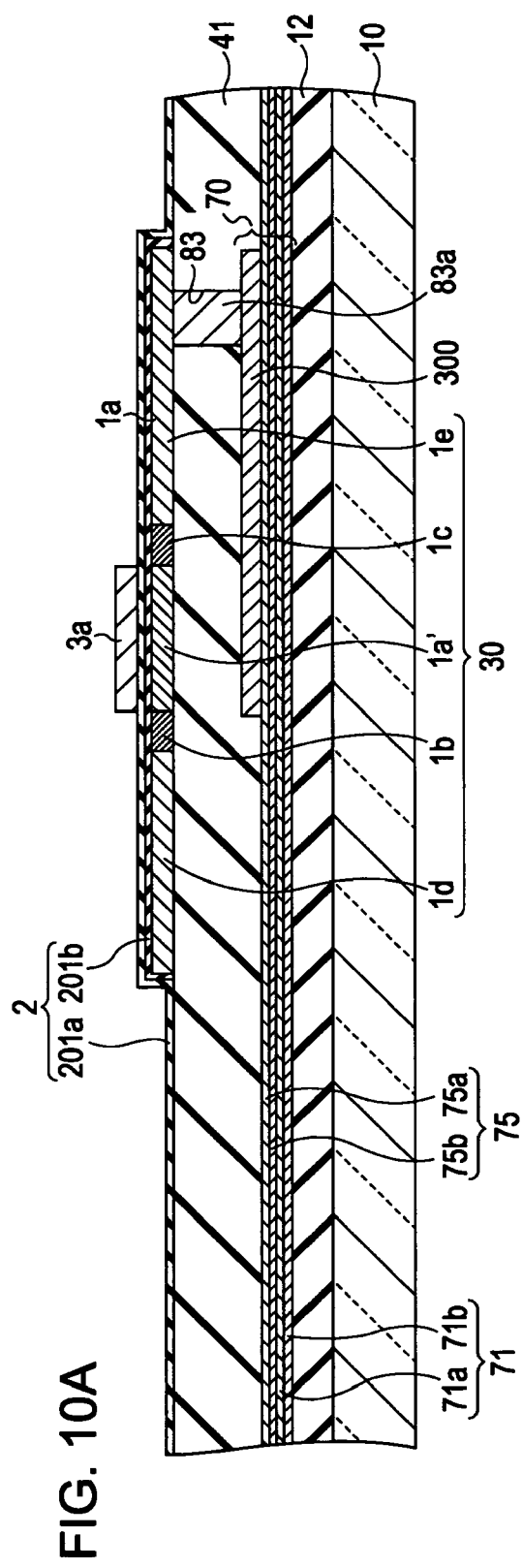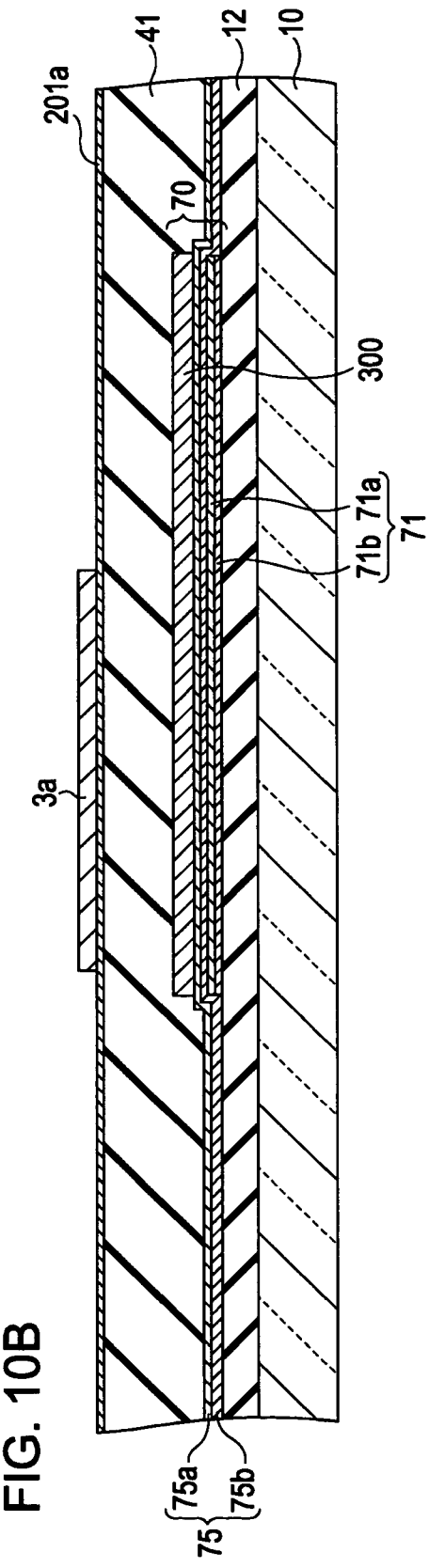

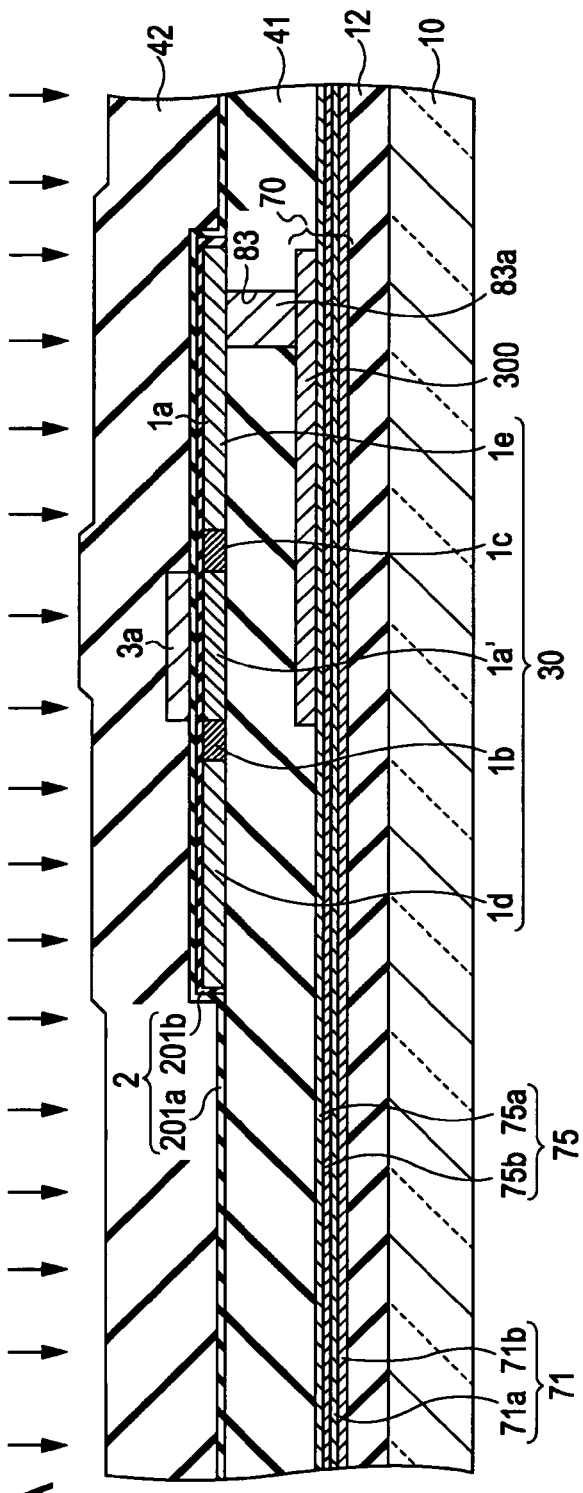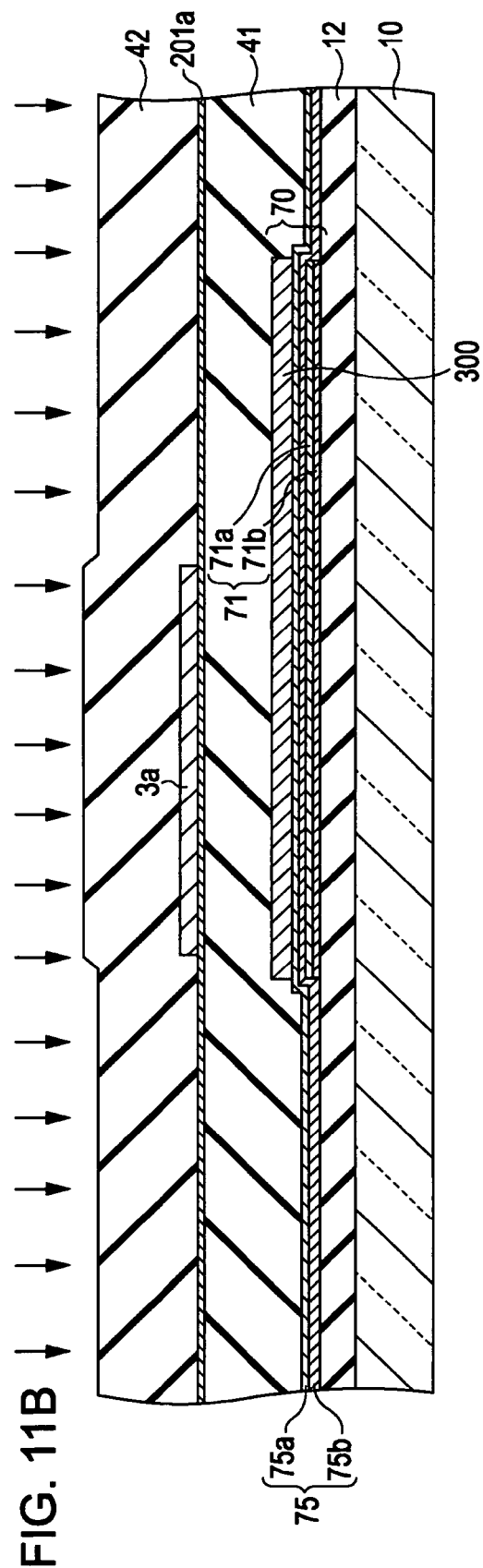

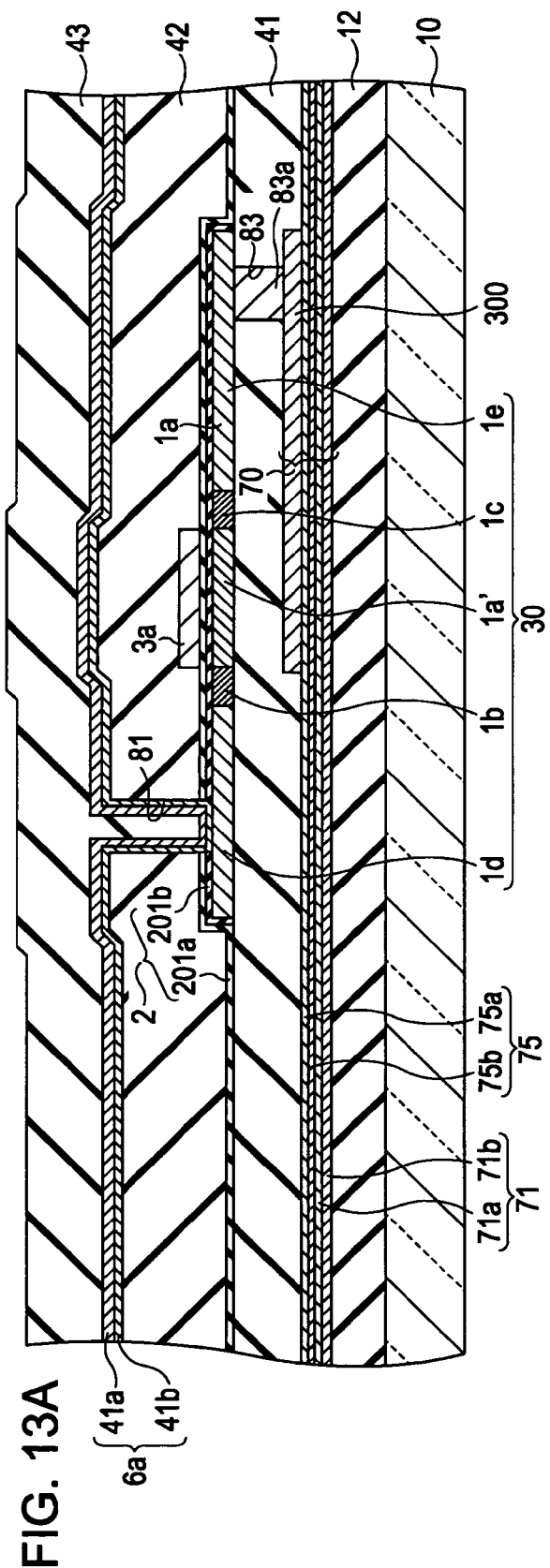
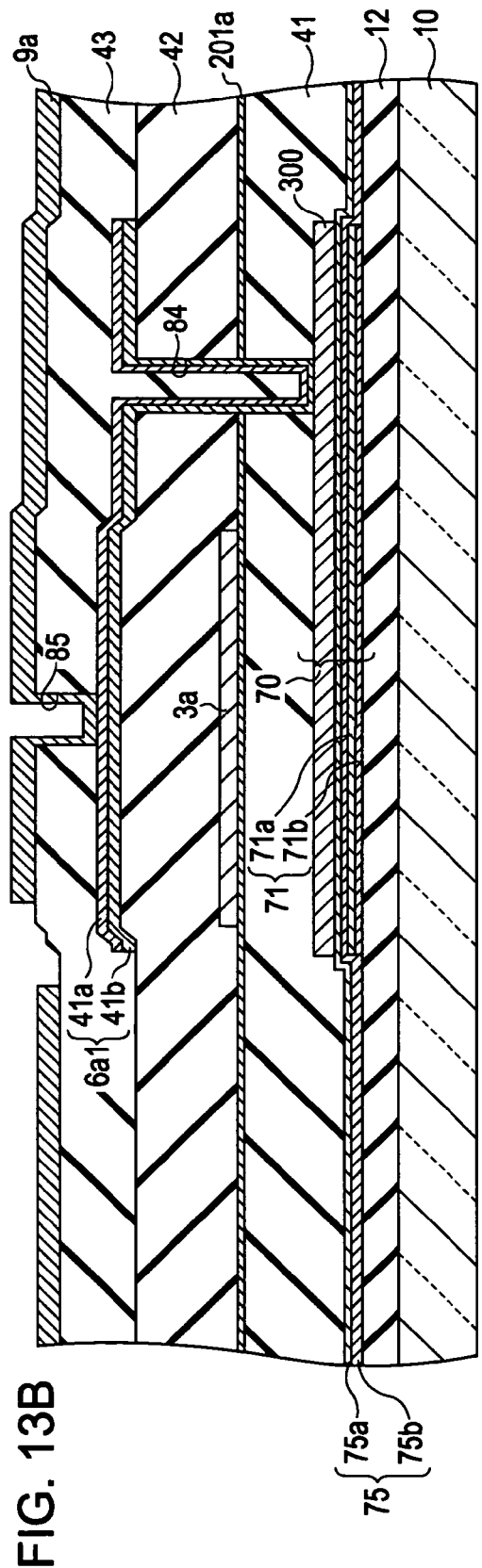
FIG. 13A
FIG. 13B

ELECTRO-OPTICAL DEVICE, METHOD OF PRODUCING THE SAME, AND ELECTRONIC APPARATUS

BACKGROUND

1. Technical Field

The present invention relates to electro-optical devices such as liquid crystal devices, methods for producing the same, and various electronic apparatuses including the same.

2. Related Art

A typical electro-optical device includes, as described in JP-A-2000-75320, an electro-optical material, such as liquid crystal, held between a pair of a thin-film transistor (TFT) array substrate and a counter substrate. In a pixel region where a plurality of pixels are arranged in a plane on the TFT array substrate, pixel electrodes for applying voltages to the liquid crystal are disposed in associated pixel portions. In addition, TFTs for switching ON and OFF the associated pixel electrodes and storage capacitors electrically connected to the TFTs along with the pixel electrodes are disposed in the associated pixel portions. In the specification, the "pixel region" may be referred to as an "image display region".

According to a technique described in JP-A-2000-75320, the TFTs and the storage capacitors are arranged in the same layer in the associated pixel portions on the TFT array substrate. Alternatively, the storage capacitors and the TFTs may be arranged in the associated pixel portions on the TFT array substrate so that the storage capacitors lie in a layer above the TFTs and, as viewed in plan, the storage capacitors are superimposed on the TFTs.

In a process of producing such an electro-optical device, after the TFTs and the storage capacitors are formed, hydrogenation is performed over a semiconductor layer of each of the TFTs from an upper layer via the associated storage capacitor.

According to the structure in which the TFTs and the storage capacitors are arranged in the same layer in the associated pixel portions on the TFT array substrate, as viewed in plan on the TFT array substrate, the area of non-opening regions is increased whereas the area of opening regions is decreased because of the arrangement of the TFTs and the storage capacitors, resulting in a possible reduction in the aperture ratio. In contrast, according to the structure in which the storage capacitors lie in a layer above the TFTs in the associated pixel portions on the TFT array substrate, the aperture ratio can be improved. However, since the TFTs hide behind the shadows of the storage capacitors, as viewed in plan on the TFT array substrate, hydrogenation performed from an upper layer during the production of the electro-optical device is blocked by the storage capacitors, resulting in ineffective hydrogenation. As a result, the characteristics of the TFTs become unstable and are deteriorated, resulting in a reduction in yield in the process of producing the electro-optical device and possible deterioration of image quality.

SUMMARY

An advantage of some aspects of the invention is that it provides an electro-optical device capable of improving, for example, yield and displaying a high-quality image, a method of producing the same, and an electronic apparatus including the same.

An electro-optical device according to a first aspect of the invention includes a substrate; a plurality of data lines and a plurality of scanning lines arranged in a pixel region on the substrate; transistors disposed in associated pixel portions in the pixel region on the substrate, the transistors being electrically connected to the data lines and the scanning lines, and the transistors each having a semiconductor layer subjected to hydrogenation performed from an upper layer; storage capacitors disposed below the transistors in the associated pixel portions on the substrate, the storage capacitors being electrically connected to the transistors; and pixel electrodes disposed in the associated pixel portions on the substrate, the pixel electrodes being electrically connected to the transistors and the storage capacitors.

According to the electro-optical device of the aspect of the invention, the data lines and the scanning lines are arranged vertically and horizontally in, for example, non-opening regions in the pixel region on the substrate, and the pixel portions are arranged corresponding to the intersections between the data lines and the scanning lines. In the pixel portions, the transistors and the storage capacitors are also arranged in, for example, the non-opening regions, and the pixel electrodes are arranged in opening regions. In the invention, regions of pixels or pixel portions in which an image is displayed by, for example, light transmission are referred to as "opening regions", and the area ratio of the opening regions occupying the total area of the pixels (i.e., the opening regions and the non-opening regions other than the opening regions) is referred to as the "aperture ratio".

The electro-optical device described above can be driven using an active matrix drive system. That is, the electro-optical device is driven by supplying scanning signals to the transistors in the associated pixel portions via the scanning lines, thereby turning ON the transistors. In the pixel portions, image signals are supplied via the turned-ON transistors to the pixel electrodes through the data lines, and an image according to the image signals is displayed in the opening regions. In a liquid crystal device having, for example, liquid crystal as an electro-optical material held between a pair of substrates, the storage capacitors in the pixel portions are electrically connected to the transistors, and the storage capacitors are electrically connected in parallel to the pixel electrodes. In this case, the storage capacitors prevent leakage of image signals held in the pixel electrodes. In other words, the storage capacitors lengthen the time the image signals are held in the pixel electrodes.

In producing the electro-optical device, after the transistors and the storage capacitors are formed, hydrogenation serving as activation is performed over the semiconductor layer of each of the transistors from an upper layer after the semiconductor layer is formed. In the electro-optical device according to the aspect of the invention, the storage capacitors are disposed below the transistors on the substrate. Accordingly, the semiconductor layer of each of the transistors is prevented from being hidden in the shadow of a conductive film or a dielectric film constituting the storage capacitor, and, as a result, the efficiency of hydrogenation is prevented from being degraded due to blocking by such various films.

Therefore, hydrogenation can be efficiently performed over the semiconductor layer of each of the transistors. As a result, the characteristics of the transistors are prevented from becoming unstable due to insufficient hydrogenation of the semiconductor layer. This improves yield in the process of producing the electro-optical device and the characteristics of the transistors in the pixel portions.

In addition, as viewed in plan on the substrate, it is preferable that the transistors and the storage capacitors be superimposed on each other in the pixel portions. Accordingly, compared with the structure described in JP-A-2000-75320, the area needed to arrange the transistors and the storage capacitors in the pixel portions is reduced, as viewed in plan on substrate, and the area of the opening regions is increased. As a result, the aperture ration can be improved.

According to the electro-optical device of the aspect of the invention described above, a high-quality image can be displayed.

It is preferable that the transistors and the storage capacitors be disposed so as to be superimposed on each other as viewed in plan on the substrate.

According to the aspect of the invention, the aperture ratio of the electro-optical device can be improved. It is noted that the phrase "superimposed on each other" means "arranged so that one is stacked on the other" or "arranged so as to partly overlap each other".

It is preferable that each of the storage capacitors be electrically connected to the semiconductor layer via a plug.

According to the aspect of the invention, the resistance of the electrical connection between each of the transistors and each of the storage capacitors can be reduced by using a conductive metal plug or a conductive silicide plug.

It is preferable that at least a surface of the plug in contact with the semiconductor layer be formed of a non-metal material.

According to the structure described above, the semiconductor layer is prevented from being contaminated with a metal material forming the surface of the plug in contact with the conductive film. Alternatively, the surface of the plug in contact with the storage capacitor may be formed of a non-metal material.

It is preferable that each of the storage capacitors include an upper capacitor electrode, a lower capacitor electrode, and a dielectric film held between the upper capacitor electrode and the lower capacitor electrode. It is also preferable that at least one of the upper capacitor electrode and the lower capacitor electrode be formed of a light-blocking material capable of blocking light.

According to the aspect of the invention, one or both of the upper capacitor electrode and the lower capacitor electrode formed of the light-blocking material is arranged into, for example, a pattern defining at least some of non-opening regions in the pixel portions. Accordingly, light entering the semiconductor layer of each of the transistors from the below can be blocked by one or both of the upper and lower capacitor electrodes of the storage capacitor. This suppresses the generation of photo leakage current in the transistors in the pixel portions and prevents the generation of display unpleasant effects such as flickering in the electro-optical device.

In this case, the lower capacitor electrodes may be formed of the light-blocking material, and the lower capacitor electrodes may be arranged in a lattice-shaped pattern defining non-opening regions of the pixel portions, as viewed in plan on the substrate.

According to the structure described above, because of the lower capacitor electrodes of the storage capacitors, light entering the transistors from the below can be blocked in substantially all the non-opening regions in the pixel portions. As a result, light entering the semiconductor layers of the transistors from the below can be blocked in a more effective manner.

It is preferable that the data lines be arranged on the substrate so that the data lines are above the transistors and, as viewed in plan, the data lines are superimposed on the transistors. It is also preferable that the data lines be formed of a light-blocking material capable of blocking light.

According to the aspect of the invention, as viewed in plan on the substrate, the area needed to arrange the transistors and the data lines in the pixel portions is reduced, and the area of the opening regions is increased, thereby improving the aperture ratio. In this case, hydrogenation over the semiconductor layer of each of the transistors may be performed prior or subsequent to the formation of the data lines in the process of producing the electro-optical device.

According to the aspect of the invention, the data lines are formed, for example, above the transistors on the substrate so as to define some of the non-opening regions in the direction in which the data lines extend. Accordingly, light entering the semiconductor layers of the transistors from the above can be blocked by the data lines in the pixel portions. This can more reliably suppress the generation of photo leakage current in the transistors in the pixel portions.

In this case, as viewed in plan on the substrate, the data lines may have extensions extending as a branch along a direction intersecting a direction in which the data lines extend so that the data lines define some of the non-opening regions in the pixel portions arranged along the data lines in the direction in which the data lines extend and in the direction intersecting the direction in which the data lines extend.

According to the structure described above, light entering some of the non-opening regions along the direction intersecting the direction in which the data lines extend is prevented from entering the semiconductor layers of the transistors by the extensions of the data lines. As a result, light entering the semiconductor layers of the transistors from the above can be blocked in a more effective manner.

In the invention, the phrase "define some of the non-opening regions . . . in the direction in which the data lines extend and in the direction intersecting the direction in which the data lines extend" means that, for example, some of the contours of the non-opening regions along the Y direction or the direction (vertical direction) in which the data lines extend (in other words, some of the contours of the opening regions along the direction in which the data lines extend) are defined, and some of the contours of the non-opening regions along the X direction or the direction (horizontal direction) intersecting the direction in which the data lines extend (in other words, some of the contours of the opening regions along the direction intersecting the direction in which the data lines extend) are defined.

In this case, the electro-optical device may further include island-shaped light-blocking films disposed above the transistors in the pixel portions arranged along the data lines on the substrate, the light-blocking films extending in a direction intersecting a direction in which the data lines extend so that the light-blocking films define, together with the data lines, some of the non-opening regions in the direction in which the data lines extend and in the direction intersecting the direction in which the data lines extend.

According to the structure described above, light entering some of the non-opening regions along the direction intersecting the direction in which the data lines extend is prevented from entering the semiconductor layers of the transistors by the island-shaped light-blocking films. Such light-blocking films are formed of a light-blocking material capable of blocking light.

It is preferable that the electro-optical device further include an interlayer insulating film serving as a film underlying the transistors on the substrate, the interlayer insulating film providing interlayer insulation between the storage capacitors and the transistors, and the interlayer insulating film having a planarized surface.

According to the aspect of the invention, the surface of the interlayer insulating film formed as the film underlying the transistors is prevented from becoming irregular due to the storage capacitors, thereby achieving a substantially planar surface relative to the surface of the substrate. As a result, the characteristics of each of the transistors are prevented from being deteriorated by, for example, a high resistance of the semiconductor layer due to vertical meandering of the shape of the semiconductor layer in the cross section of the transistor because of the irregular surface of the interlayer insulating film.

In this case, the surface of the interlayer insulating film may be planarized by chemical mechanical polishing.

According to the structure described above, the irregular shape due to the storage capacitors is prevented by the highly planar interlayer insulating film.

A groove may be formed on the substrate so that the storage capacitor is superimposed on the groove, as viewed in plan on the substrate. In this case, the storage capacitor is arranged above the groove in each pixel portion. This prevents the surface of the interlayer insulating film, which serves as the film underlying the transistors and which is formed so as to provide interlayer insulation between the storage capacitors and the transistors, from becoming irregular due to the storage capacitor. Accordingly, for example, the above-described chemical mechanical polishing performed thereafter can be done in a relatively short period of time.

An electronic apparatus according to another aspect of the invention includes the electro-optical device (including various types) according to the aforementioned aspect of the invention.

Since the electronic apparatus according to the aspect of the invention includes the above-described electro-optical device according to the aspect of the invention, various electronic apparatuses capable of improving yield and displaying a high-quality image, such as a projection display device, a television, a cellular phone, an electronic notebook, a word processor, a viewfinder or monitor-direct-viewing videocassette recorder, a workstation, a videophone system, a point-of-sale (POS) terminal, and a touch panel can be realized.

According to another aspect of the invention, there is provided an electro-optical device producing method including forming storage capacitors in associated pixel portions in a pixel region on a substrate; forming transistors each having a semiconductor layer in the associated pixel portions on the substrate so that the transistors are disposed above the storage capacitors and the transistors are electrically connected to the storage capacitors; performing hydrogenation over the semiconductor layer from an upper layer after the transistors are formed; forming a plurality of data lines and a plurality of scanning lines in the pixel region on the substrate, the data lines and the scanning lines being electrically connected to the transistors; and forming pixel electrodes in the associated pixel portions on the substrate, the pixel electrodes being electrically connected to the transistors and the storage capacitors.

In the electro-optical device producing method according to the aspect of the invention, as in the above-described electro-optical device according to the aspect of the invention, yield in the process of producing the electro-optical device can be improved, and a high-quality image can be displayed by the electro-optical device. The formation of the data lines and the scanning lines and the formation of the pixel electrodes may be performed prior or subsequent to hydrogenation or the like.

Other effects and advantages of the invention will eventually become apparent from the detailed description of the invention below.

BRIEF DESCRIPTION OF THE DRAWINGS

The invention will be described with reference to the accompanying drawings, wherein like numbers reference like elements.

FIGS. 8A and 8B are step diagrams (part 2) sequentially showing the laminated structure of the electro-optical device in steps of the producing process regarding the cross-sectional views shown in FIGS. 5 and 6.

FIGS. 9A and 9B are step diagrams (part 3) sequentially showing the laminated structure of the electro-optical device in steps of the producing process regarding the cross-sectional views shown in FIGS. 5 and 6.

FIGS. 10A and 10B are step diagrams (part 4) sequentially showing the laminated structure of the electro-optical device in steps of the producing process regarding the cross-sectional views shown in FIGS. 5 and 6.

FIGS. 11A and 11B are step diagrams (part 5) sequentially showing the laminated structure of the electro-optical device in steps of the producing process regarding the cross-sectional views shown in FIGS. 5 and 6.

FIGS. 13A and 13B are step diagrams (part 7) sequentially showing the laminated structure of the electro-optical device in steps of the producing process regarding the cross-sectional views shown in FIGS. 5 and 6.

DESCRIPTION OF EXEMPLARY EMBODIMENTS

Embodiments of the invention will be described with reference to the drawings. In the embodiments described below, an electro-optical device is applied to a liquid crystal device.

1. Liquid Crystal Device

Figure 1:
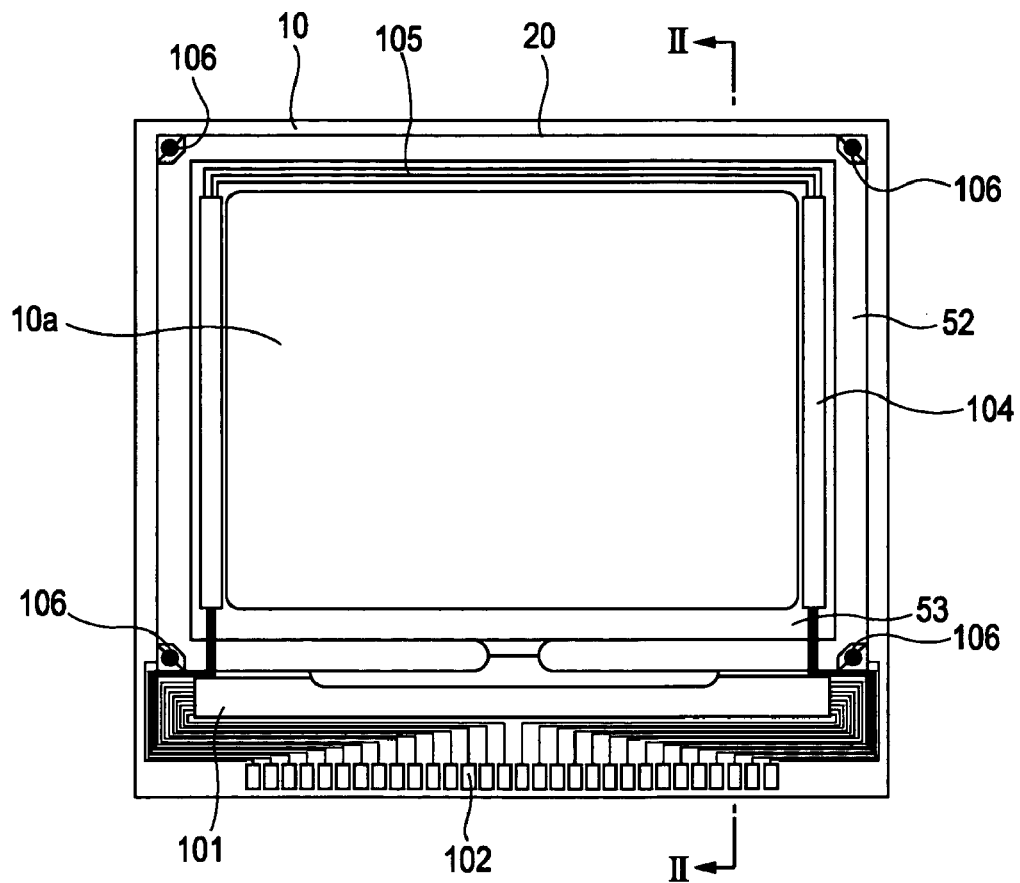
FIG. 1 is a plan view of the overall structure of an electro-optical device.
Figure 2:
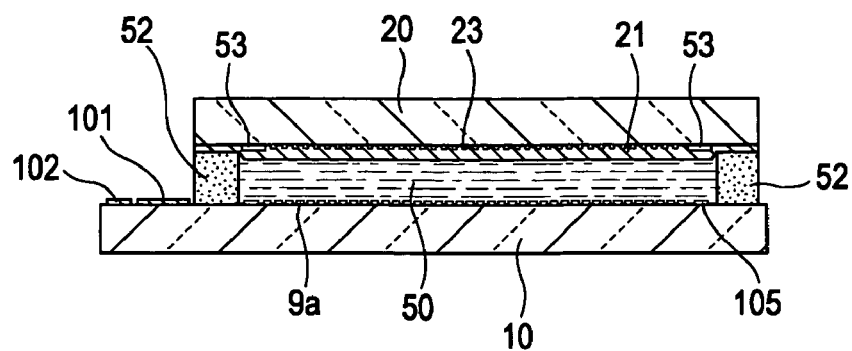
FIG. 2 is a cross-sectional view taken along the line II-II of FIG. 1.

The structure of an electro-optical device according to an embodiment will be described with reference to FIGS. 1 and 2. FIG. 1 is a plan view of the electro-optical device including a TFT array substrate and components arranged thereon, as viewed from the side of a counter substrate. FIG. 2 is a cross-sectional view taken along the line II-II of FIG. 1. Here, a TFT-active-matrix-drive-type liquid crystal device with built-in drive circuits will be described as an exemplary electro-optical device.

In FIG. 2, the components of the electro-optical device are depicted in various suitable scales so that the components are easily recognizable in the drawing. This similarly applies to FIG. 3 and the subsequent figures. Also, in FIG. 2 and in the cross-sectional views subsequent to FIG. 3, the components are depicted in various suitable scales so that the components are easily recognizable in the drawing.

Referring to FIGS. 1 and 2, the electro-optical device according to the embodiment has a TFT array substrate 10 and a counter substrate 20, which are disposed so as to face each other. A liquid crystal layer 50 is sealed between the TFT array substrate 10 and the counter substrate 20. The TFT array substrate 10 and the counter substrate 20 are bonded to each other with a sealing member 52 disposed in a sealing region around the periphery of an image display region 10a.

The sealing member 52 used for bonding the substrates 10 and 20 is formed of, for example, ultraviolet (UV) curable resin, thermosetting resin, or the like, which is disposed onto the TFT array substrate 10 and is then cured by exposure to UV light, heat, or the like in the producing process. Spacers (not shown) formed of material, such as glass fiber or glass bead, are dispersed in the sealing member 52 to keep the gap between the TFT array substrate 10 and the counter substrate 20 (inter-substrate gap) at a predetermined spacing. That is, the electro-optical device according to the embodiment is useful for compact and enlargement display applications, e.g., a light valve of a projector.

A frame light-blocking film 53 is disposed on the counter substrate 20 so as to define a frame region of the image display region 10a along the inner periphery of the sealing region in which the sealing member 52 is disposed. All or part of the frame light-blocking film 53 may be provided on the TFT array substrate 10 as an internal light-blocking film.

In a region of the peripheral region outside the sealing region in which the sealing member 52 is disposed, a data line drive circuit 101 and external circuit connecting terminals 102 are disposed along one side of the TFT array substrate 10. Scanning line drive circuits 104 are disposed along two sides adjacent to the side along which the data line drive circuit 101 and the external circuit connection terminals 102 are disposed. The scanning line drive circuits 104 are covered with the frame light-blocking film 53. A plurality of wiring lines 105 for connecting the two scanning line drive circuits 104 disposed along the two sides of the image display region 10a are disposed along the remaining side of the TFT array substrate 10, and the plurality of wiring lines 105 are covered with the frame light-blocking film 53.

Conducting members 106 serving as conducting terminals between the two substrates are disposed at four corners of the counter substrate 20. At the same time, conducting terminals (not shown) are disposed on the TFT array substrate 10 at positions facing the conducting members 106. These conducting members 106 and the terminals (not shown) allow electrical conduction between the TFT array substrate 10 and the counter substrate 20.

Referring to FIG. 2, after pixel-switching TFTs and wiring lines including scanning lines and data lines are formed on the TFT array substrate 10, pixel electrodes 9 are disposed, and an alignment film (not shown) is formed on the pixel electrodes 9a. In the embodiment, the pixel switching elements are not limited to the TFTs and may be various transistors or thin film diodes (TFDs). In contrast, besides a lattice-shaped or stripe-shaped black matrix 23 and a counter electrode 21 disposed on the counter substrate 20, an alignment film (not shown) is formed as the uppermost layer on the counter substrate 20. The liquid crystal layer 50 is formed of, for example, one kind of nematic liquid crystal or a mixture of several kinds of nematic liquid crystal, and is aligned in a predetermined state between the pair of alignment films. Additional polarizing plates (not shown) according to the alignment directions are provided on the back of the TFT array substrate 10 and the counter substrate 20 facing each other.

Besides the data line drive circuit 101, the scanning line drive circuits 104, etc., the peripheral area of the TFT array substrate 10 shown in FIGS. 1 and 2 may additionally include a sampling circuit for sampling image signals on image signal lines and supplying the sampled image signals to data lines, a pre-charge circuit for supplying pre-charge signals having predetermined voltage levels to the data lines prior to the image signals, an inspection circuit for inspecting the quality, defects, etc., of the electro-optical device during production or at the time of shipment, etc.

2. Structure of Pixel Portions

The structure of pixel portions of the liquid-crystal device according to the embodiment of the invention will be described with reference to FIGS. 3 to 6.

Figure 3:
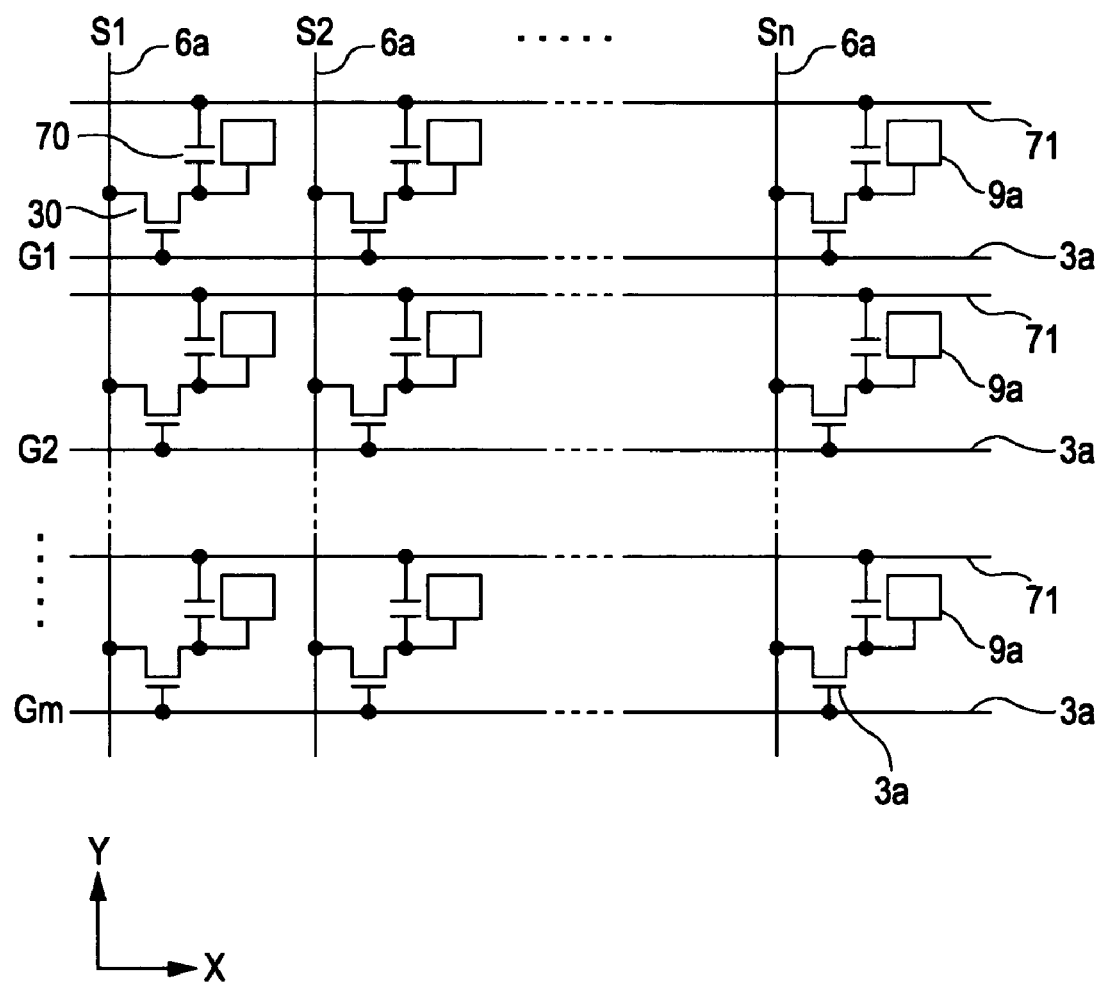
FIG. 3 is an equivalent circuit diagram of various elements and wiring lines in a plurality of pixel portions arranged into a matrix in an image display region of the electro-optical device.
Figure 4:
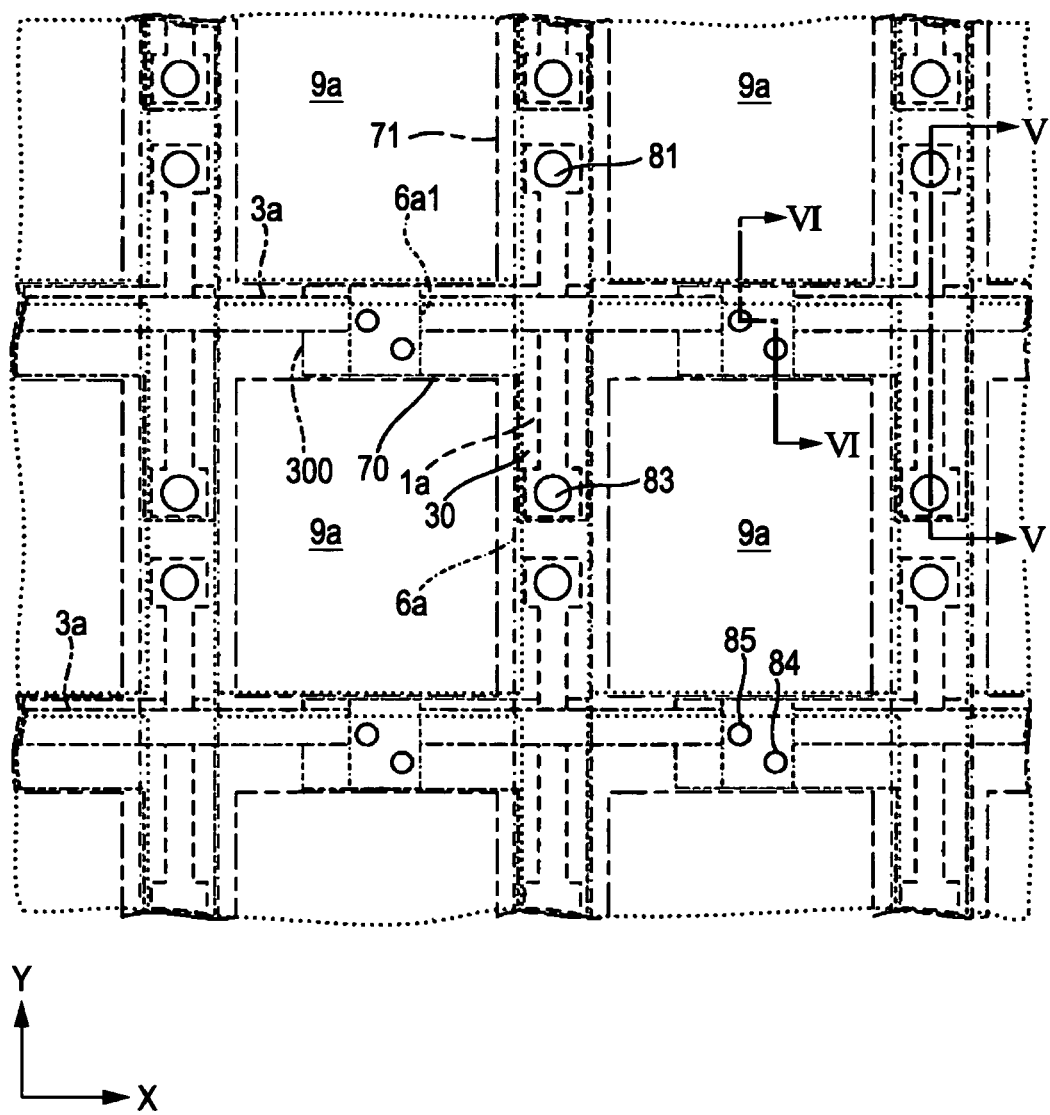
FIG. 4 is a plan view of a plurality of pixel groups adjacent to one another on a TFT array substrate on which data lines, scanning lines, and pixel electrodes are disposed.
Figure 5:
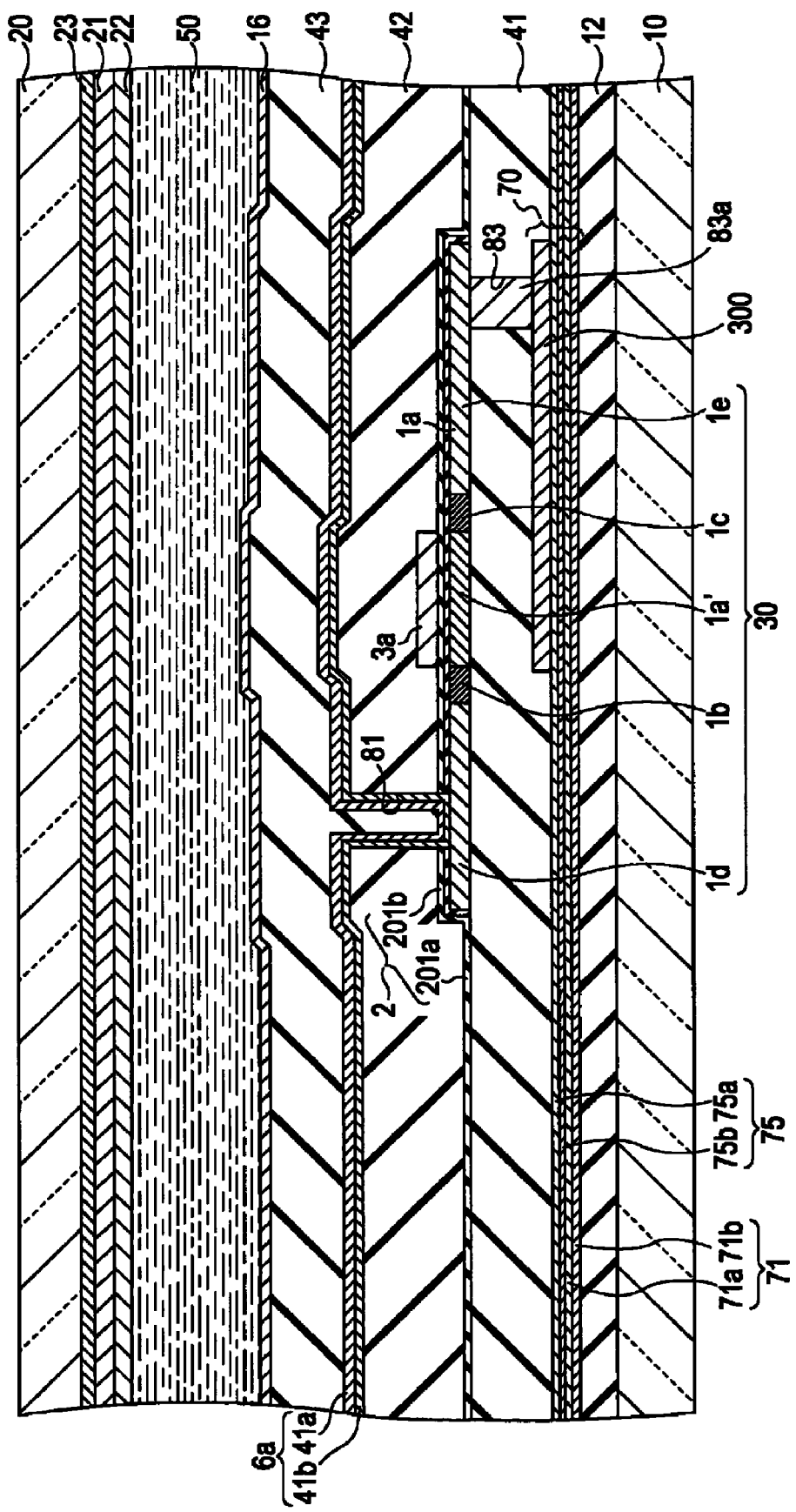
FIG. 5 is a cross-sectional view taken along the line V-V of FIG. 4.
Figure 6:
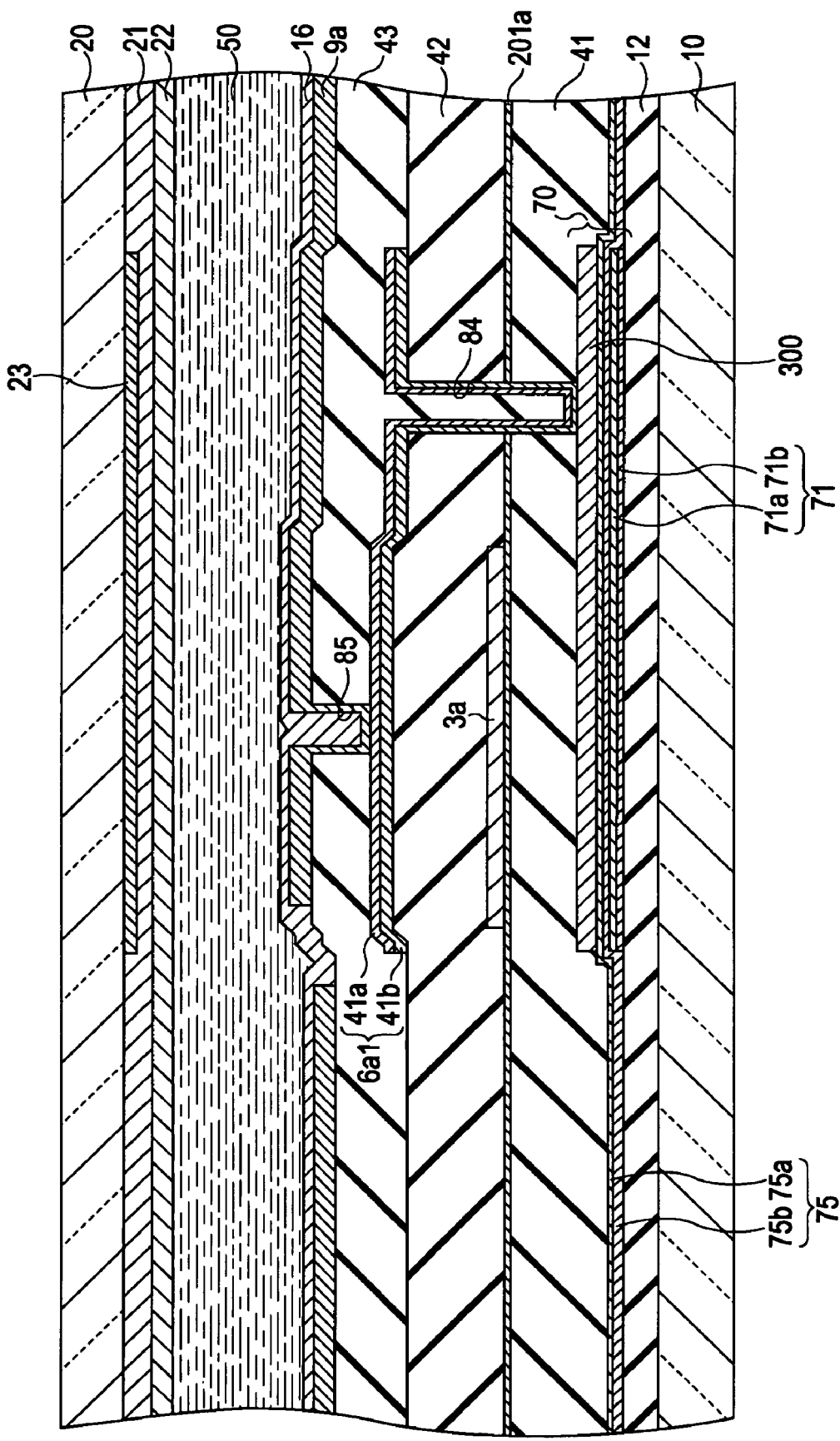
FIG. 6 is a cross-sectional view taken along the line VI-VI of FIG. 4.

FIG. 3 is an equivalent circuit diagram of various elements and wiring lines in a plurality of pixel portions arranged into a matrix in the image display region of the electro-optical device. FIG. 4 is a plan view of a plurality of pixel groups adjacent to one another on the TFT array substrate on which the data lines, the scanning lines, and the pixel electrodes are arranged. FIG. 5 is a cross-sectional view taken along the line V-V of FIG. 4. FIG. 6 is a cross-sectional view taken along the line VI-VI of FIG. 4.

Referring to FIG. 3, the pixel portions arranged into a matrix in the image display region of the electro-optical device according to the embodiment include the pixel electrodes 9a and TFTs 30 for switching ON and OFF the associated pixel electrodes 9a. Data lines 6a to which image signals are supplied are electrically connected to the sources of the TFTs 30. Image signals S1, S2, ..., and Sn written onto the data lines 6a may be supplied sequentially in this order of data lines or may be supplied in units of groups of the adjacent data lines 6a.

Scanning lines 3a are electrically connected to the gates of the TFTs 30. Scanning signals G1, G2, ..., and Gm are sequentially applied to the scanning lines 3a in a pulsating manner at a predetermined timing in this order of scanning lines. The pixel electrodes 9a are electrically connected to the drains of the associated TFTs 30. By switching ON the TFTs 30 serving as switching elements for a predetermined period of time, the image signals S1, S2, ..., and Sn supplied from the data lines 6a are written at a predetermined timing.

The image signals S1, S2, ..., and Sn having a predetermined level written into the liquid crystal serving as an exemplary electro-optical material via the pixel electrodes 9a are held between the pixel electrodes 9a and the counter electrode 21 disposed on the counter substrate 20 for a predetermined period of time. In response to application of a voltage to the liquid crystal, the orientation and order of the molecular assembly of the liquid crystal are changed according to the level of the applied voltage, thereby modulating light and implementing the grayscale display. In the normally white mode, the transmission factor of the liquid crystal in response to incident light is decreased as the voltage applied to each pixel increases. In the normally black mode, the transmission factor of the liquid crystal in response to incident light is increased as the voltage applied to each pixel increases. When considering the transmission factors of all the pixels, light having a contrast level in accordance with the image signals is emitted from the electro-optical device.

To prevent leakage of the image signals held, storage capacitors 70 are added electrically in parallel with liquid crystal capacitors formed between the pixel electrodes 9a and the counter electrode 21. The storage capacitors 70 include lower capacitor electrodes 71. Structurally, the lower capacitor electrodes 71 are disposed alongside the scanning lines 3a, include fixed-potential-side capacitor electrodes, and are fixed at a constant potential.

Referring to FIG. 1 or 2, the scanning signals G1, G2, ..., and Gm are supplied by the scanning line drive circuits 104 to the scanning lines 3a at a predetermined timing in the above-described manner (see FIG. 3), and the image signals S1, S2, ..., and Sn are supplied by the data line drive circuit 101 to the data lines 6a at a predetermined timing in the above-described manner (see FIG. 3).

A detailed description will now be given of the specific structure of the pixel portions with reference to FIGS. 4 to 6. The electro-optical device includes, as shown in FIG. 5 or 6, the TFT array substrate 10 which is implemented by, for example, a quartz substrate, a glass substrate, or a silicon substrate, and the counter substrate 20 facing the TFT array substrate 10, which is implemented by, for example, a glass substrate or a quartz substrate.

As shown in FIG. 4 or 6, the pixel electrodes 9a are provided on the TFT array substrate 10. An alignment film 16 processed by a predetermined alignment treatment such as a rubbing treatment is disposed on the pixel electrodes 9a. The pixel electrodes 9a are composed of, for example, a transparent conductive film such as an indium tin oxide (ITO) film with a thickness of, for example, 83.5 nm. In contrast, the counter electrode 21 is disposed on the entire surface of the counter substrate 20. An alignment film 22 processed by a predetermined alignment treatment such as a rubbing treatment is disposed below the counter electrode 21. As in the above-described pixel electrodes 9a, the counter electrode 21 is composed of, for example, a transparent conductive film such as an ITO film.

An electro-optical material such as liquid crystal is sealed in a space defined by the sealing member 52 (see FIGS. 1 and 2) between the TFT array substrate 10 and the counter substrate 20 facing each other, thereby forming the liquid crystal layer 50. When no electrical field is applied from the pixel electrodes 9a to the liquid crystal layer 50, the liquid crystal layer 50 is aligned in a predetermined alignment state by the alignment films 16 and 22.

In the embodiment, as shown in FIG. 5 or 6, the black matrix 23 having, for example, a lattice-shaped pattern for defining non-opening regions of the pixel portions in the image display region 10a is disposed in a layer below the counter electrode 21 (above the counter electrode 21 in FIG. 5 or 6) on the side of the counter substrate 20 facing the TFT array substrate 10. In the embodiment, besides various light-blocking films disposed on the TFT array substrate 10 (which will be described later), the black matrix 23 may be disposed on the counter substrate 20 in this manner to define the non-opening regions.

The layers of a laminated structure on the TFT array substrate 10 will be described below in sequence, starting from the lower layer to the upper layer.

A first layer includes the storage capacitors 70, and an underlying insulating film 12 with a thickness of, for example, 400 nm is disposed below the first layer. Being disposed on the entire surface of the TFT array substrate 10, the underlying insulating film 12 serves the function of preventing characteristics of the pixel-switching TFTs 30 from being changed due to the roughness of the TFT array substrate 10 caused by surface polishing or a residual contamination after washing.

Referring to FIGS. 4 and 5, the storage capacitor 70 is formed by arranging part of the lower capacitor electrode 71 serving as the fixed-potential-side capacitor electrode to face part of an upper capacitor electrode 300 with a dielectric film 75 disposed therebetween. The storage capacitors 70 significantly improve the electrical potential retention property of the pixel electrodes 9a.

More specifically, in the embodiment, as shown in FIG. 4, the lower capacitor electrodes 71 are formed of a conductive light-blocking material into, for example, a lattice-shaped pattern defining non-opening regions of the TFT array substrate 10, and the lower capacitor electrodes 71 lie in a layer below the TFTs 30. In this case, opening regions defined by the lower capacitor electrodes 71 serve as opening regions through which incident light can pass in the pixel portions. As is clear from the plan view of FIG. 4, the storage capacitors 70 according to the embodiment are formed so that the storage capacitors 70 do not reach the opening regions serving as the light-passing regions substantially corresponding to areas where the pixel electrodes 9a are disposed (in other words, the storage capacitors 70 are contained in light-blocking regions (i.e., non-opening regions)). Thus, the electro-optical device as a whole maintains a relatively large pixel aperture ratio, allowing display of brighter images.

According to the embodiment, because of the lower capacitor electrodes 71, light entering semiconductor layers 1a of the TFTs 30 from the below can be more effectively blocked in substantially all the non-opening regions in the pixel portions. This suppresses the generation of photo leakage current in the TFTs 30 in the pixel portions and prevents the generation of display unpleasant effects such as flickering in the electro-optical device.

In addition, the lower capacitor electrodes 71 function as the fixed-potential-side capacitor electrodes. The lower capacitor electrodes 71 are each formed by stacking, for example, a conductive polysilicon film 71a with a thickness of, for example, 150 nm on, for example, a metal silicide film 71b with a thickness of 150 nm formed of a metal silicide containing high melting point metal such as tungsten (W) or the like. The lower capacitor electrodes 71 extend from the image display region 10a where the pixel electrodes 9a are disposed to the periphery thereof and are electrically connected to a constant potential source, thereby defining a fixed potential.

The upper capacitor electrodes 300 are each formed of, for example, a conductive polysilicon film with a thickness of, for example, 150 nm and functions as a pixel-potential-side capacitor electrode. Since the upper capacitor electrode 300 is formed of the polysilicon film, unlike the case in which the upper capacitor electrode 300 is formed of a metal silicide film containing, for example, tungsten (W) or the like, the upper capacitor electrode 300 can have a satisfactorily planar surface, and, as a result, the voltage resistance of the storage capacitors 70 can be ensured. As shown in FIG. 4, the upper capacitor electrodes 300 are islands in an L-shaped pattern extending from a direction along the X direction (the direction in which the scanning lines 3a extend, that is, the direction intersecting the direction in which the data lines 6a extend) to a direction along the Y direction (the direction in which the data lines 6a extend) in the non-opening regions in the pixel portions, as viewed in plan on the TFT array substrate 10. According to the embodiment, the upper capacitor electrodes 300 have a function of electrically relaying the pixel electrodes 9a to heavily doped drain regions 1e of the TFTs 30 having a lightly doped drain (LDD) structure, which will be described later. The structure regarding the relay connection will be described in detail later.

According to the embodiment, for example, the upper capacitor electrodes 300 may be formed of a light-blocking material similar to that of the lower capacitor electrodes 71. In this case, both of the upper capacitor electrodes 300 and the lower capacitor electrodes 71 may define at least some of the non-opening regions in the pixel portions.

As shown in FIG. 5 or 6, the dielectric film 75 has a two-layer structure including, for example, a lower silicon oxide ($SiO_2$) film 75b, such as a relatively thin high temperature oxide (HTO) film with a thickness of about 5 nm, and an upper silicon nitride (SiN) film 75a with a thickness of about 15 nm.

Next, a second layer includes the TFTs 30 and the scanning lines 3a including the gate electrodes of the TFTs 30. On the TFT array substrate 10, a first interlayer insulating film 41 with a thickness of, for example, 60 nm is disposed above the upper capacitor electrode 300 in the first layer and below the TFT 30. It is preferable that the surface of the first interlayer insulating film 41 be planarized.

In the first interlayer insulating film 41, as shown in FIG. 5, a contact hole 83 for electrically connecting the heavily doped drain region 1e of each of the TFTs 30 having an LDD structure, which will be described later, to the upper capacitor electrode 300 is bored in the first interlayer insulating film 41 so that the contact hole 83 penetrates the first interlayer insulating film 41. By filling the contact hole 83 with conductive polysilicon, a plug 83a is fabricated to have a height in the vertical direction of, for example, 500 nm relative to the surface of the TFT array substrate 10. Accordingly, the storage capacitor 70 is electrically connected to the TFT 30 via the plug 83a. Because of the electrical connection via the plug 83a, the resistance can be reduced.

Alternatively, the plug 83a may have a two-layer structure including, for example, a lower titanium nitride (TiN) film with a thickness of 150 nm and an upper film formed of tungsten (W) with a thickness of 350 nm. In particular, it is preferable that at least the surface of the plug 83a in contact with the heavily doped drain region 1e be formed of a non-metal material in order to prevent the semiconductor layer 1a from being contaminated with a metal material forming the surface of the plug 83a in contact with the heavily doped drain region 1e. Alternatively, it is also preferable that at least the surface of the plug 83a in contact with the upper capacitor electrode 300 be formed of a non-metal material in order to prevent the upper capacitor electrode 300 of the storage capacitor 70 from being contaminated with a metal material forming the surface of the plug 83a in contact with the upper capacitor electrode 300.

In addition, as shown in FIG. 6, a contact hole 84 for electrically connecting a relay electrode 6a1, which will be described later, to the upper capacitor electrode 300 is bored in the first interlayer insulating film 41 so that the contact hole 84 penetrates a second interlayer insulating film 42, which will be described later.

Referring to FIG. 5, the second layer includes the TFT 30 above the first interlayer insulating film 41. The TFT 30 has, for example, an LDD structure, as shown in FIG. 5. The components of the TFT 30 include a gate electrode forming part of the scanning line 3a described above, an insulating film 2 including two films 201a and 201b, and the semiconductor layer 1a. The two films 201a and 201b include a gate insulating film for insulating the gate electrode 3a from the semiconductor layer 1a. That is, the two films 201a and 201b include a film with a thickness of, for example, 31.5 nm, produced by performing thermal oxidation of an amorphous silicon film constituting the semiconductor layer 1a, and a high temperature oxide (HTO) film with a thickness of, for example, 55 nm. The semiconductor layer 1a includes an amorphous silicon film with a thickness of, for example, 55 nm. Specifically, the semiconductor layer 1a includes a channel region 1a' where a channel is formed by an electric field applied from the gate electrode 3a, a lightly doped source region 1b, a lightly doped drain region 1c, a heavily doped source region 1d, and the heavily doped drain region 1e.

According to the embodiment, hydrogenation is performed over the semiconductor layer 1a of the TFT 30 from an upper layer, thereby activating the semiconductor layer 1a. As shown in FIG. 4, the TFTs 30 and the storage capacitors 70 are disposed so as to be superimposed on each other so that both of the TFTs 30 and the storage capacitors 70 do not reach the opening regions, as viewed in plan on the TFT array substrate 10. Accordingly, compared with the structure described in JP-A-2000-75320, the area needed to arrange the TFT 30 and the storage capacitor 70 in each pixel portion is reduced, as viewed in plan on the TFT array substrate 10. As a result, the area of the opening regions is increased, thereby improving the aperture ratio.

According to the embodiment, the second layer includes the scanning lines 3a including the gate electrodes of the TFTs 30, which are formed of, for example, a conductive polysilicon film with a thickness of, for example, about 350 nm. The scanning lines 3a are arranged in a pattern extending along the X direction in FIG. 4 and are arrayed in stripes in the image display region 10a on the TFT array substrate 10.

A third layer subsequent to the second layer includes the data lines 6a and the relay electrodes 6a1. As shown in FIG. 5 or 6, the second interlayer insulating film 42 with a thickness of, for example, 600 nm is formed between the second and third layers, which is above the scanning line 3a and below the data line 6a and the relay electrode 6a1. A contact hole 81 for electrically connecting the heavily doped source region 1d of the TFT 30 to the data line 6a is bored in the second interlayer insulating film 42 so that the contact hole 81 penetrates the second interlayer insulating film 42 and the insulating film 2 to reach the surface of the heavily doped source region 1d. In addition, the aforementioned contact hole 84 is bored in the second interlayer insulating film 42 so that the contact hole 84 penetrates the second interlayer insulating film 42, the insulating film 2, and the first interlayer insulating film 41 to reach the surface of the upper capacitor electrode 300.

In the third layer, the data lines 6a are arranged in a pattern extending along the Y direction in FIG. 4 and are arrayed in stripes in the image display region 10a on the TFT array substrate 10. As shown in FIG. 4, the data lines 6a are disposed so as to be superimposed on the TFTs 30, as viewed in plan on the TFT array substrate 10, and are formed of a conductive light-blocking material. More specifically, the data lines 6a are each formed of a two-layer laminated structure including, for example, as shown in FIG. 5, a lower titanium nitride film 41b with a thickness of, for example, 150 nm and an upper aluminum (Al) film 41a with a thickness of, for example, 350 nm. Thus, in this case, as viewed in plan on the TFT array substrate 10, the area needed to arrange the TFTs 30 and the data lines 6a is further reduced, and the area of the opening regions is further increased, thereby improving the aperture ratio. Because the data lines 6a define some of the non-opening regions above the TFTs 30 in the direction in which the data lines 6a extend (i.e., direction along the Y direction), light entering the semiconductor layers 1a of the TFTs 30 from the above can be blocked by the data lines 6a in the pixel portions.

In the third layer, as shown in FIG. 4 or 6, the relay electrodes 6a1 are patterned as islands formed of, for example, the same films as those of the data lines 6a. That is, as in the data lines 6a, the relay electrodes 6a1 are each formed as a two-layer laminated structure including the lower titanium nitride film 41b and the upper aluminum (Al) film 41a. As shown in FIG. 4, as viewed in plan on the TFT array substrate 10, the relay electrodes 6a1 are arranged so as to be superimposed on the scanning lines 3a and the upper capacitor electrodes 300 in the non-opening regions and so as to be disposed between the adjacent data lines 6a.

The relay electrodes 6a1 described above are not limited to those lying in the same layer and having the same films as the data lines 6a. Alternatively, for example, the relay electrodes 6a1 may be disposed in the same layer as the scanning lines 3a and may be formed of the same film as the scanning lines 3a.

Referring to FIG. 4 or 6, a fourth layer subsequent to the third layer includes the pixel electrodes 9a arranged into a matrix corresponding to the intersections between the data lines 6a and the scanning lines 3a. In addition, the alignment film 16 is disposed on the pixel electrodes 9a. Between the third and fourth layers, a third interlayer insulating film 43 with a thickness of, for example, 600 nm is disposed below the pixel electrodes 9a and above the data lines 6a and the relay electrodes 6a1. A contact hole 85 for electrically connecting the pixel electrode 6a to the relay electrode 6a1 is bored in the third interlayer insulating film 43. An electrical connection is thus established between the pixel electrode 9a and the TFT 30 via the contact hole 85, the relay electrode 6a1, the contact hole 84, the upper capacitor electrode 300, and the plug 83a, which have been described above.

3. Method of Producing Electro-Optical Device

A process of producing the above-described electro-optical device according to the embodiment will be described below with reference to FIGS. 7A to 13B. FIGS. 7A to 13B are step diagrams sequentially showing a laminated structure of the electro-optical device in steps of the producing process regarding the cross-sectional views shown in FIGS. 5 and 6. More specifically, in FIGS. 7A to 13B, FIGS. 7A, 8A, . . . and 13A show only the laminated structure on the TFT array substrate 10 regarding the cross-sectional view of FIG. 5, and FIGS. 7B, 8B, . . . and 13B show only the laminated structure on the TFT array substrate 10 regarding the cross-sectional view of FIG. 6.

In the following description, only the major production steps regarding the laminated structure on the TFT array substrate 10 serving as features of the embodiment will be described in particular detail, and descriptions of steps of producing a structure on the counter substrate 20 or the like will be omitted.

Figure 7A:
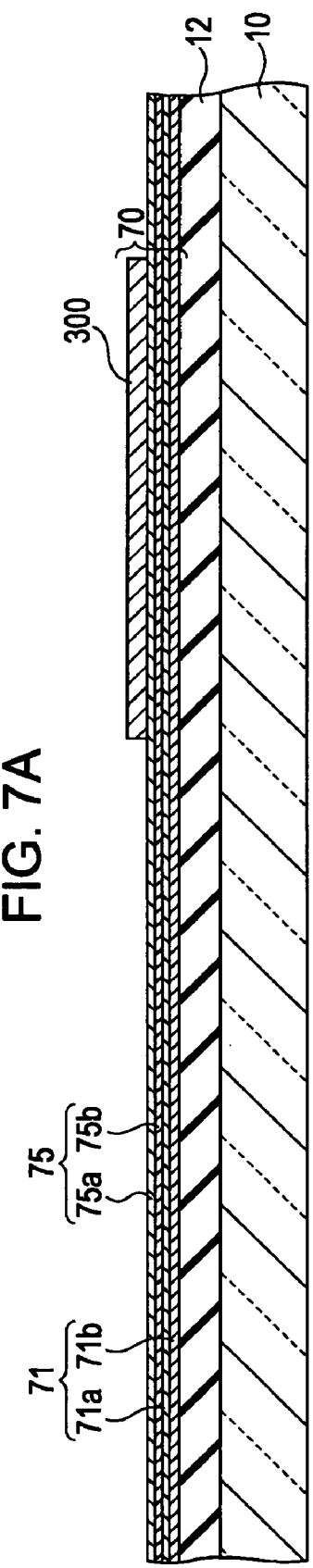
FIGS. 7A and 7B are step diagrams (part 1) sequentially showing a laminated structure of the electro-optical device in steps of a producing process regarding the cross-sectional views shown in FIGS. 5 and 6.
Figure 7B:
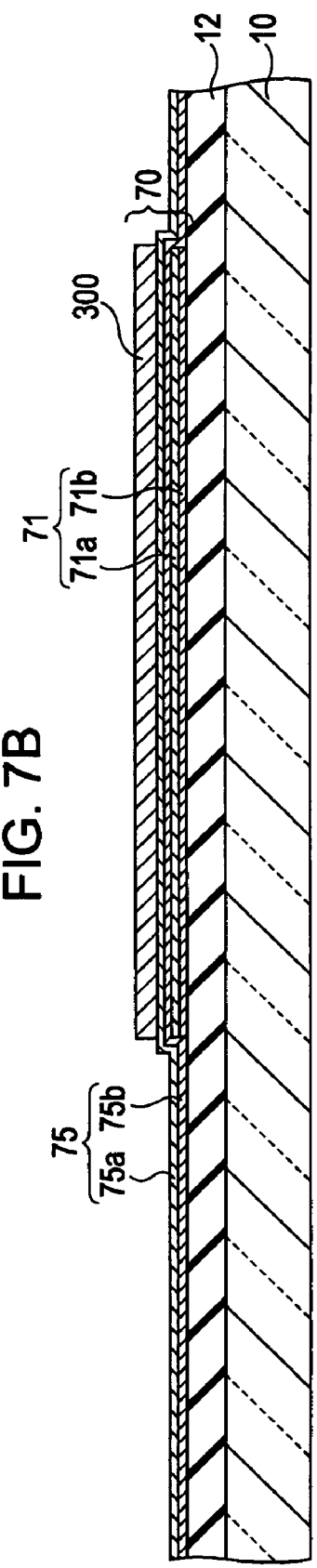

In the steps shown in FIGS. 7A and 7B, a predetermined pretreatment is performed on the TFT array substrate 10 so that distortion of the substrate caused by a high-temperature process or the like to be performed later can be reduced, and, thereafter, the underlying insulating film 12 is formed on the TFT array substrate 10 by atmospheric pressure chemical vapor deposition (CVD) or low-pressure CVD using, for example, a tetraethyl orthosilicate (TEOS) gas or the like.

Next, the storage capacitor 70 is formed on the underlying insulating film 12. Specifically, the lower capacitor electrode 71 and the upper capacitor electrode 300 are formed by patterning a conductive polysilicon film and a metal silicide film by photoetching. More specifically, the conductive polysilicon film is made by depositing a polysilicon film by low-pressure CVD or the like and thermally diffusing phosphorous (P) to make the polysilicon film electrically conductive. The metal silicide film is formed by, for example, sputtering. In addition, the dielectric film 75 is formed by patterning a high-temperature silicon oxide film (HTO film) or a silicon nitride film formed by, for example, low-pressure CVD or plasma CVD.

In the next steps of FIGS. 8A and 8B, for example, the first interlayer insulating film 41 is formed, as in the underlying insulating film 12. The first interlayer insulating film 41 has an irregular surface because of the storage capacitor 70. In the next steps of FIGS. 9A and 9B, the first interlayer insulating film 41 is planarized by, for example, chemical mechanical polishing (CMP). As a result, the first interlayer insulating film 41 has a substantially planar surface relative to the surface of the TFT array substrate 10.

In the next steps of FIGS. 10A and 10B, the TFT 30 and the scanning line 3a are formed on the first interlayer insulating film 41. More specifically, the contact hole 83 is formed in the surface-planarized first interlayer insulating film 41 by, for example, dry etching, wet etching, or a combination of both. The contact hole 83 is filled with conductive polysilicon to fabricate the plug 83a.

Thereafter, an amorphous silicon film is formed by low-pressure CVD or the like. The amorphous silicon film is patterned by, for example, photoetching to form the semiconductor layer 1a. Next, for example, the surface of the amorphous silicon film is thermally oxidized, and an HTO film is formed by low-pressure CVD or the like, thereby forming the insulating film 2 including the gate insulating film. Thereafter, a polysilicon film is deposited by, for example, low-pressure CVD or the like, and phosphorous (P) is thermally diffused to make the polysilicon film electrically conductive. Thereafter, the conductive polysilicon film is patterned by, for example, photoetching to form the scanning line 3a. Next, the semiconductor layer 1a of the pixel-switching TFT 30 with an LDD structure is formed by doping the semiconductor layer 1a with impurity ions at two doping levels, i.e., low and high doping levels, thereby forming the lightly doped source region 1b, the lightly doped drain region 1c, the heavily doped source region 1d, and the heavily doped drain region 1e of the semiconductor layer 1a.

As has been described above, since the first interlayer insulating film 41 serving as a film underlying the TFT 30 can reliably have a planar surface, the characteristics of the TFT 30 are prevented from being deteriorated by, for example, a high resistance of the semiconductor layer 1a due to vertical meandering of the shape of the semiconductor layer 1a in the cross section of the TFT 30 because of the irregular surface of the first interlayer insulating film 41.

In the next steps of FIGS. 11A and 11B, after the second interlayer insulating film 42 is formed in a manner similar to forming, for example, the underlying insulating film 12 and the first interlayer insulating film 41, hydrogenation is performed over the semiconductor layer 1a of the TFT 30 from above the second interlayer insulating film 42, thereby activating the semiconductor layer 1a. Such hydrogenation is performed by, for example, hydrogen annealing or hydrogen plasma processing. Since the storage capacitor 70 is disposed below the TFT 30 in each pixel portion on the TFT array substrate 10, the semiconductor layer 1a is prevented from being hidden in the shadow of the upper capacitor electrode 300 or the like included in the storage capacitor 70. As a result, the efficiency of hydrogenation is prevented from being degraded due to blocking by various films. Alternatively, such hydrogenation can be performed after the data lines 6a and the like are formed in the third layer.

Figure 12A:
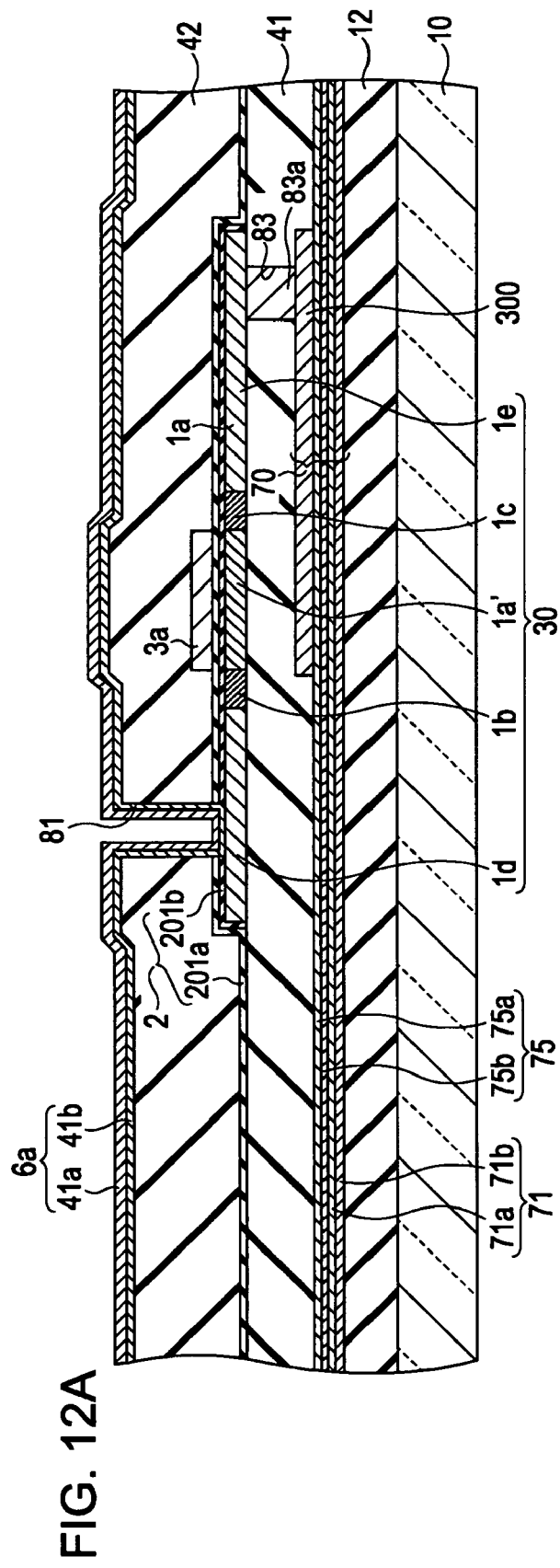
FIGS. 12A and 12B are step diagrams (part 6) sequentially showing the laminated structure of the electro-optical device in steps of the producing process regarding the cross-sectional views shown in FIGS. 5 and 6.
Figure 12B:
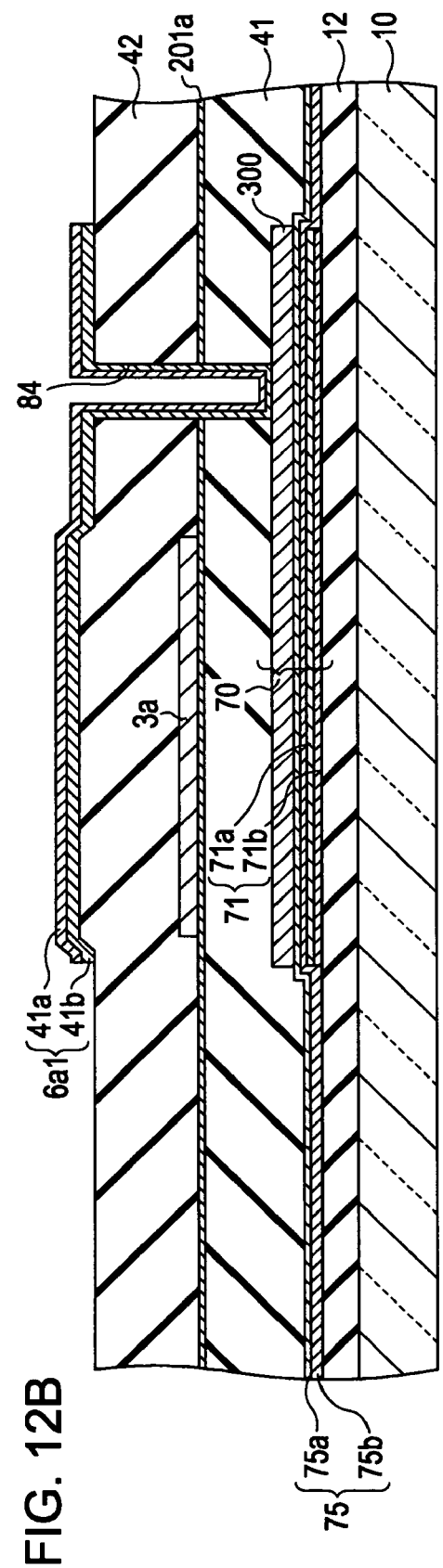

In the next steps of FIGS. 12A and 12B, the contact hole 81 is bored in the second interlayer insulating film 42 by, for example, dry etching, wet etching, or a combination of both, and the contact hole 84 is bored in the second interlayer insulating film 42 so that the contact hole 84 penetrates the second interlayer insulating film 42, the insulating film 2, and the first interlayer insulating film 41. Thereafter, a titanium nitride film and an aluminum film are formed by, for example, sputtering, and these films of various types are then subjected to photoetching to form the data line 6a and the relay electrode 6a1.

In the next steps of FIGS. 13A and 13B, the third interlayer insulating film 43 is formed by doping it with, for example, phosphorus (P) by, for example, atmospheric pressure CVD or low-pressure CVD using, for example, a TEOS gas or the like. The contact hole 85 is bored in the third interlayer insulating film 43 by, for example, dry etching, wet etching, or a combination of both. Thereafter, an ITO film is formed by, for example, sputtering or the like, and the pixel electrodes 9a are formed by photoetching.

According to the above-described producing process, hydrogenation can be efficiently performed over the semiconductor layer 1a of the TFT 30, thereby preventing the characteristics of the TFT 30 from becoming unstable due to insufficient hydrogenation of the semiconductor layer 1a. Thus, yield in the process of producing the electro-optical device can be improved, and the characteristics of the TFT 30 in each pixel portion can be improved. According to the embodiment, a high-quality image can be displayed.

4. Modification

A modification of the above-described embodiment will be described with reference to FIGS. 14A to 15B.

Figure 14A:
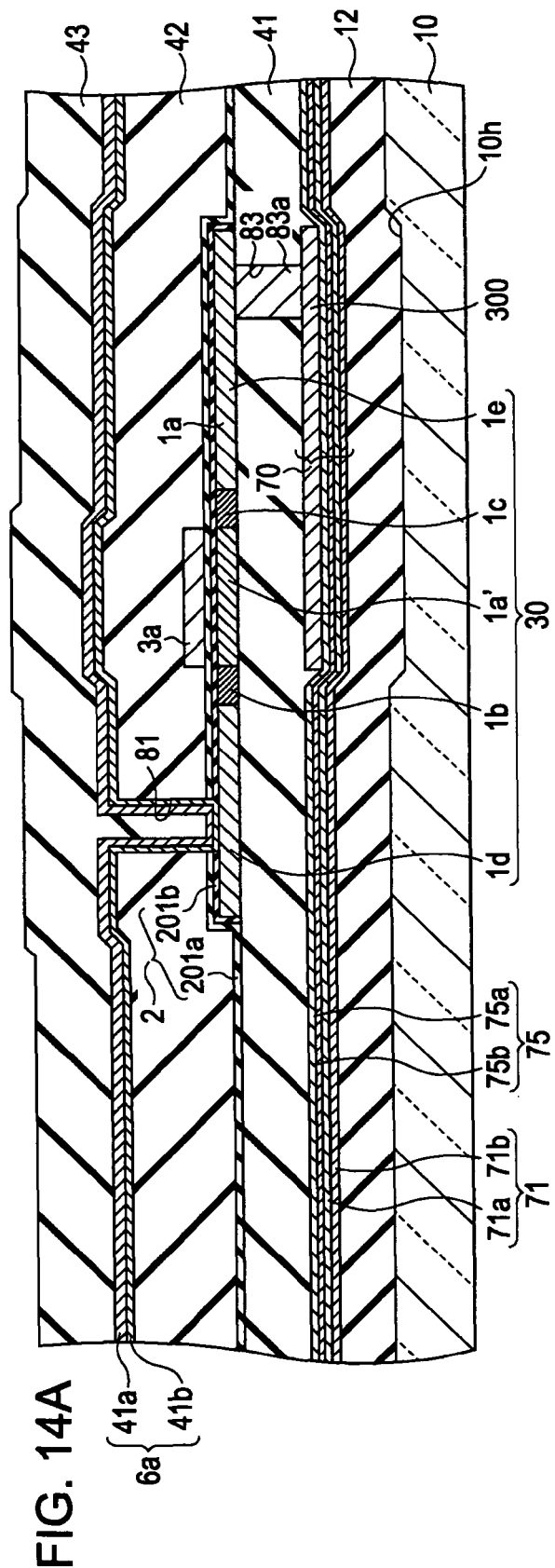
FIG. 14A is a cross-sectional view of a structure according to a modification corresponding to that shown in FIG. 5.
Figure 14B:
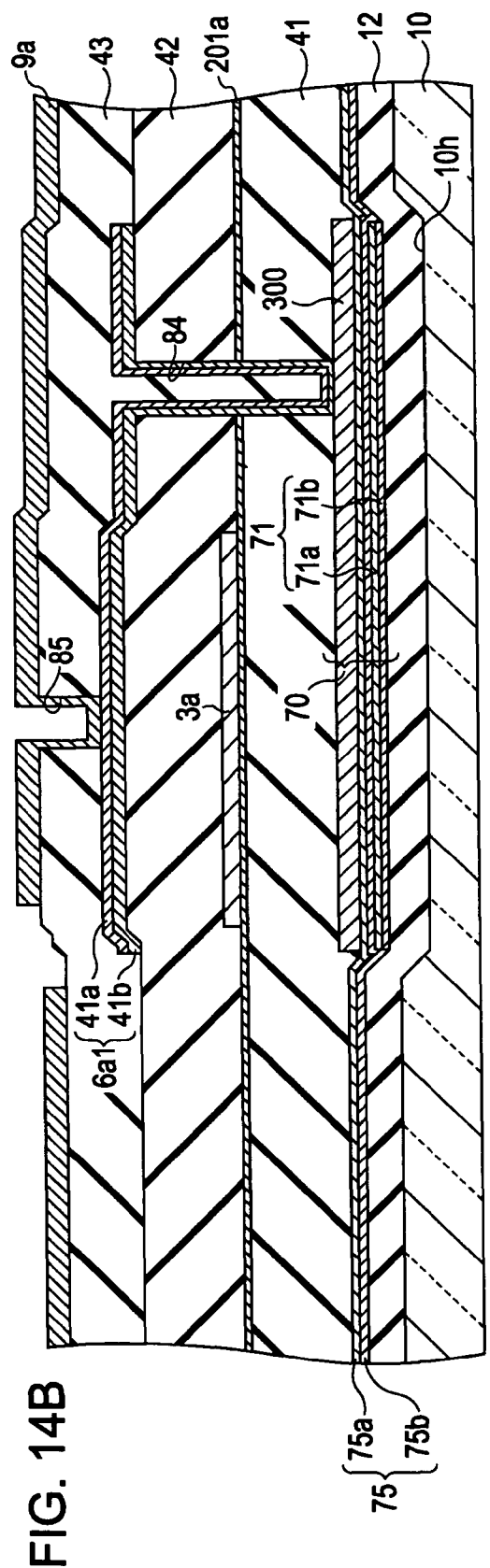
FIG. 14B is a cross-sectional view of the structure according to the modification corresponding to that shown in FIG. 6.

With reference to FIGS. 14A and 14B, a structure according to a modification will be described. FIG. 14A is a cross-sectional view of a structure according to a modification corresponding to the cross section in FIG. 5, and FIG. 14B is a cross-sectional view of the structure according to the modification corresponding to the cross section in FIG. 6. In FIGS. 14A and 14B, only major portions of a laminated structure on the TFT array substrate 10 are shown.

As shown in FIGS. 14A and 14B, as viewed in plan on the TFT array substrate 10, a groove 10h may be formed in each pixel portion on the TFT array substrate 10 so that the storage capacitor 70 and particularly the upper capacitor electrode 300 are superimposed on the groove 10h. In this case, the upper capacitor electrode 300 of the storage capacitor 70 in each pixel portion is arranged above the groove 10h on the TFT array substrate 10. The groove 10h may have, for example, a lattice-shaped pattern in association with the planar pattern of the lower capacitor electrode 71 described with reference to FIG. 4. Alternatively, the groove 10h may have, for example, an L-shaped pattern in association with the planar pattern of the upper capacitor electrode 300. In any case, it is preferable that the groove 10h be formed on the TFT array substrate 10 so that the groove 10h has a shape that reduces the irregularity of part of the first interlayer insulating film 41 serving as the film underlying the TFT 30, which is caused by the storage capacitor 70.

Accordingly, the irregularity of the surface of the first interlayer insulating film 41 serving as the film underlying the TFT 30, which is caused by the storage capacitor 70, is reduced or prevented. Also, the surface of the first interlayer insulating film 41 can be planarized in a relatively short period of time.

Figure 15A:
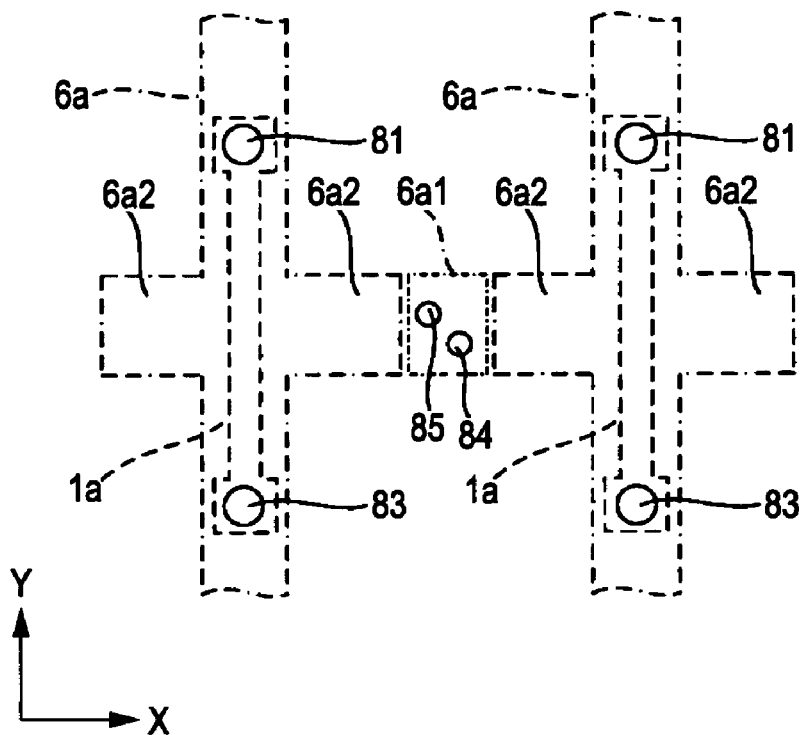
FIGS. 15A and 15B are plan views of another structure according to the modification showing the structure of data lines viewed in plan on the TFT array substrate.
Figure 15B:
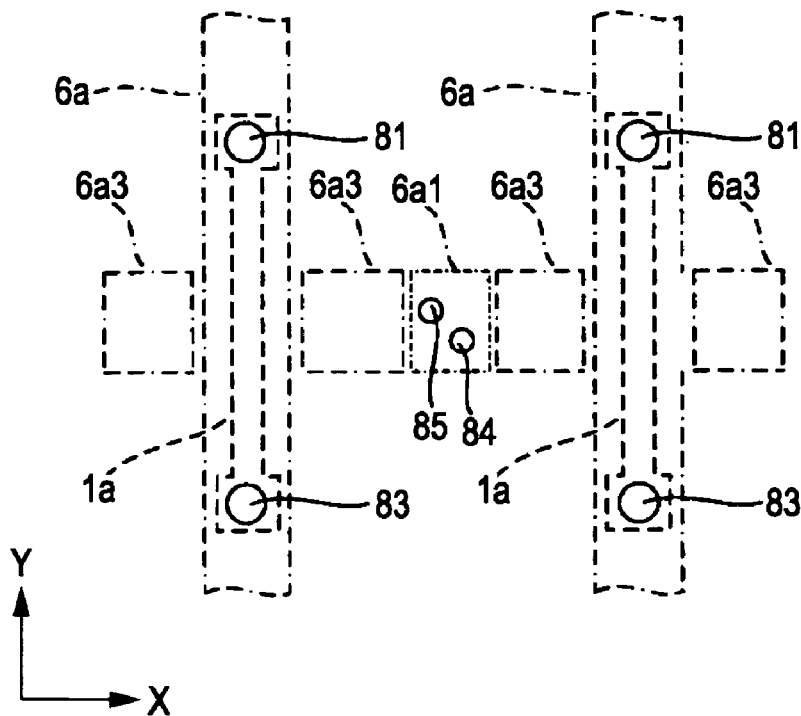

With reference to FIGS. 15A and 15B, another structure according to the modification will be described. FIGS. 15A and 15B are plan views of another structure according to the modification showing the structure of the data lines 6a viewed in plan on the TFT array substrate 10. FIGS. 15A and 15B show the arrangement relationship of the data lines 6a with the semiconductor layers 1a of the TFTs 30 and the relay electrodes 6a1.

Referring to FIG. 15A, the data lines 6a in the pixel portions arranged along the data lines 6a have extensions 6a2 extending in a direction (i.e., the X direction) intersecting a direction in which the data lines 6a extend (i.e., the Y direction) so that the extensions 6a2 define some of the non-opening regions in the X and Y directions, as viewed in plan on the TFT array substrate 10. In the pixel portions, the extensions 6a2 of the data lines 6a are separated from the relay electrodes 6a1. According to the structure, light entering some of the non-opening regions along the direction (i.e., the X direction) intersecting the direction in which the data lines 6a extend (i.e., the Y direction) is prevented from entering the semiconductor layers 1a of the TFTs 30 by the extensions 6a2 of the data lines 6a. Therefore, light entering the semiconductor layers 1a of the TFTs 30 from the above can be blocked in a more effective manner.

Referring to FIG. 15B, in the pixel portions arranged along the data lines 6a, as viewed in plan on the TFT array substrate 10, island-shaped light-blocking films 6a3 extending along the direction (i.e., the X direction) intersecting the direction in which the data lines 6a extend (i.e., the Y direction) may be formed of, for example, the same films as those of the data lines 6a so that the light-blocking films 6a3 define, together with the data lines 6a, some of the non-opening regions in the X and Y directions. In this case, as in the structure shown in FIG. 15A, light entering the semiconductor layers 1a of the TFTs 30 in the pixel portions from the above can be blocked in a more effective manner.

In the pixel portions, the light-blocking films 6a3 are separated from the data lines 6a and from the relay electrodes 6a1. Alternatively, the light-blocking films 6a3 may also serve as the relay electrodes 6a1. Alternatively, the light-blocking films 6a3 may be disposed in a layer different from that of the data lines 6a or may be formed of materials different from those of the data lines 6a.

5. Electronic Apparatus

Figure 16:
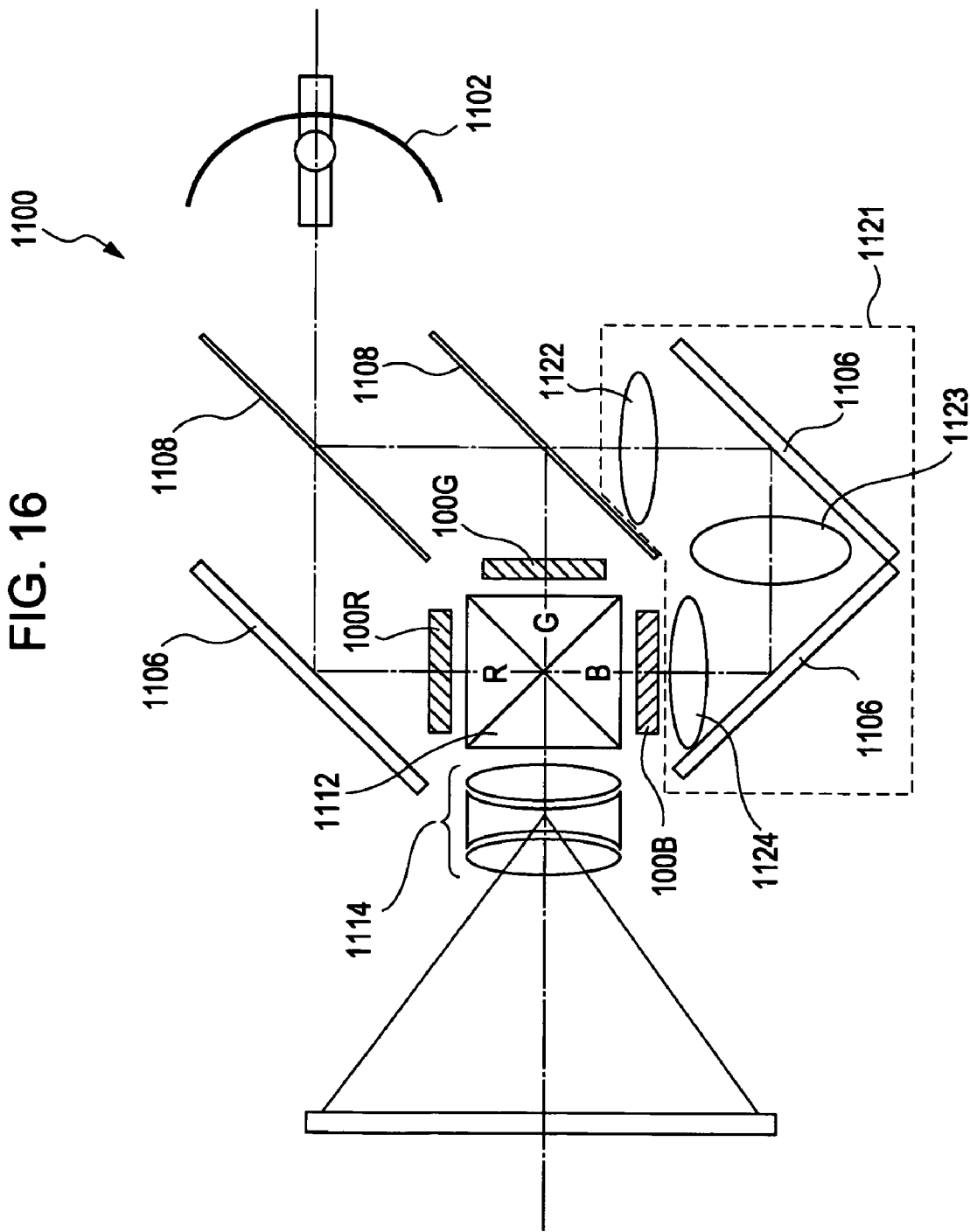
FIG. 16 is a schematic cross-sectional view of a projection color display device.

The overall structure, particularly the optical structure, of an embodiment of a projection color display device serving as an exemplary electronic apparatus using the electro-optical device described above in detail as a light valve will be described. FIG. 16 is a schematic cross-sectional view of the projection color display device.

Referring to FIG. 16, a liquid crystal projector 1100 serving as an example of the projection color display device has three liquid crystal modules including liquid crystal devices each having drive circuits mounted on a TFT array substrate as RGB light valves 100R, 100G, and 100B. In the liquid crystal projector 1100, light emitted from a lamp unit 1102, which is a white light source, such as a metal halide lamp, is separated by three mirrors 1106 and two dichroic mirrors 1108 into light components R, G, and B corresponding to the three primary colors R, G, and B. The light components R, G, and B are guided into the light valves 100R, 10G, and 100B corresponding to the three primary colors, respectively. In particular, the light component B is guided through a relay lens system 1121 including an incident lens 1122, a relay lens 1123, and an emitting lens 1124 to reduce or prevent the loss of light due to its long optical path. The light components R, G, and B modulated by the light valves 100R, 10G, and 100B, respectively, are synthesized by a dichroic prism 1112 and are then projected as a color image onto a screen via a projection lens 1114.

The invention is not limited to the foregoing embodiments, and a variety of modifications may be made without departing from the spirit and scope of the invention, which can be read from the appended claims and the whole document. Such modifications of the electro-optical device, the method of producing the same, and the electronic apparatus including the same also fall within the technical field of the invention.

What is claimed is:

1. An electro-optical device comprising:
    a substrate;
    a data line and a scanning line arranged in a pixel region on the substrate;
    a pixel electrode disposed in a pixel portion in the pixel region;
    a transistor disposed in the pixel portion in the pixel region on the substrate, the transistor being electrically connected to the data line, the scanning line, and the pixel electrode, and the transistor having a semiconductor layer subjected to hydrogenation performed from an upper side; and
    a storage capacitor electrically connected to the transistor and the pixel electrode, the storage capacitor being disposed below the transistor in the pixel portion, wherein:
        the storage capacitor includes an upper capacitor electrode, a lower capacitor electrode, and a dielectric film held between the upper capacitor electrode and the lower capacitor electrode,
        the lower capacitor electrode is formed of a light-blocking material capable of blocking light, and
        the lower capacitor electrode is arranged in a lattice-shaped pattern defining a non-opening region of the pixel portion, as viewed in plan on the substrate.

2. The electro-optical device according to claim 1, wherein the transistor and the storage capacitor are disposed so as to be superimposed on each other as viewed in plan on the substrate.

3. The electro-optical device according to claim 1, wherein the storage capacitor is each electrically connected to the semiconductor layer via a plug.

4. The electro-optical device according to claim 3, wherein at least a surface of the plug in contact with the semiconductor layer is formed of a non-metal material.

5. The electro-optical device according to claim 1, wherein the upper capacitor electrode is formed of a light-blocking material capable of blocking light.

6. The electro-optical device according to claim 1, wherein:
    the data line is arranged on the substrate so that the data line is above the transistor and, as viewed in plan, the data line is superimposed on the transistor, and
    the data line is formed of a light-blocking material capable of blocking light.

7. The electro-optical device according to claim 6, wherein, as viewed in plan on the substrate, the data line has extensions extending as a branch along a direction intersecting a direction in which the data line extends so that the data line defines some of the non-opening regions in the pixel portion arranged along the data line in the direction in which the data line extends and in the direction intersecting the direction in which the data line extends.

8. The electro-optical device according to claim 6, further comprising island-shaped light-blocking film disposed above the transistor in the pixel portion arranged along the data line on the substrate, the light-blocking film extending in a direction intersecting a direction in which the data line extends so that the light-blocking film defines, together with the data line, some of the non-opening regions in the direction in which the data line extends and in the direction intersecting the direction in which the data line extends.

9. The electro-optical device according to claim 1, further comprising an interlayer insulating film serving as a film underlying the transistor on the substrate, the interlayer insulating film providing interlayer insulation between the storage capacitor and the transistor, and the interlayer insulating film having a planarized surface.

10. The electro-optical device according to claim 9, wherein the surface of the interlayer insulating film is planarized by chemical mechanical polishing.

11. An electronic apparatus comprising the electro-optical device as set forth claim 1.

* * * * *